(12) United States Patent
Teraura

(10) Patent No.: US 11,487,961 B2
(45) Date of Patent: Nov. 1, 2022

(54) OPTICAL CODE, AND METHOD AND APPARATUS FOR READING OPTICAL CODE

(71) Applicants: DENSO WAVE INCORPORATED, Aichi-pref. (JP); TERRARA CODE RESEARCH INSTITUTE, INC., Tokai (JP)

(72) Inventor: Nobuyuki Teraura, Tokai (JP)

(73) Assignees: DENSO WAVE INCORPORATED, Aichi-pref. (JP); TERRARA CODE RESEARCH INSTITUTE, INC., Tokai (JP)

( * ) Notice: Subject to any disclaimer, the term of this patent is extended or adjusted under 35 U.S.C. 154(b) by 0 days.

(21) Appl. No.: 15/383,896

(22) Filed: Dec. 19, 2016

(65) Prior Publication Data

US 2017/0200035 A1 Jul. 13, 2017

(30) Foreign Application Priority Data

Dec. 17, 2015 (JP) .............................. JP2015-246195
Dec. 14, 2016 (JP) .............................. JP2016-241913

(51) Int. Cl.
*G06K 7/12* (2006.01)
*G06K 7/14* (2006.01)
(Continued)

(52) U.S. Cl.
CPC ........... *G06K 7/12* (2013.01); *G06K 7/10742* (2013.01); *G06K 7/1417* (2013.01); *G06K 7/1434* (2013.01); *G06K 7/1447* (2013.01); *G06K 19/0614* (2013.01); *G06K 19/06037* (2013.01); *G06K 2019/06225* (2013.01)

(58) Field of Classification Search
CPC .... G06K 7/10742; G06K 7/12; G06K 7/1417; G06K 7/1434; G06K 7/1447; G06K 19/06037; G06K 19/0614
See application file for complete search history.

(56) References Cited

U.S. PATENT DOCUMENTS 4,544,836 A * 10/1985 Galvin ..................... G07C 1/14
235/487
5,726,435 A * 3/1998 Hara .................... G06K 7/1417
235/494
(Continued)

FOREIGN PATENT DOCUMENTS

JP    H07-254037 A    10/1995
JP    2011-170430 A    9/2011
JP    2012-133743 A    7/2012

*Primary Examiner* — Thien M Le
*Assistant Examiner* — Asifa Habib
(74) *Attorney, Agent, or Firm* — Oliff PLC

(57) ABSTRACT

Provided is an optical code that retains compatibility with existing optical codes and is used for recording information different from the information recorded under prescribed conditions. Also provided are a method and a device for reading the optical code. The optical code includes a plurality of light color modules of a light color and a plurality of dark color modules of a dark color to record first data. At least the light color modules or the dark color modules are made up of a first module and a second module having different reflectance for light of a predetermined wavelength. Second data is recorded in a pattern of the first and second modules.

11 Claims, 14 Drawing Sheets

(51) Int. Cl.
*G06K 19/06* (2006.01)
*G06K 7/10* (2006.01)

(56) References Cited

U.S. PATENT DOCUMENTS

| | | | | |
|---|---|---|---|---|
| 6,119,943 | A * | 9/2000 | Christy | G06K 1/121 |
| | | | | 235/462.04 |
| 6,398,117 | B1 * | 6/2002 | Oakeson | G06K 19/06056 |
| | | | | 235/494 |
| 8,905,313 | B2 * | 12/2014 | Rapoport | G06K 19/0614 |
| | | | | 235/462.04 |
| 10,496,911 | B1 * | 12/2019 | Walters | G06V 10/50 |
| 2006/0215931 | A1 | 9/2006 | Shimomukai | |
| 2007/0090197 | A1 * | 4/2007 | Senda | G06K 19/06037 |
| | | | | 235/494 |
| 2007/0138286 | A1 * | 6/2007 | Kamijoh | G06K 19/06037 |
| | | | | 235/468 |
| 2008/0151280 | A1 * | 6/2008 | Kamijo | H04N 1/00002 |
| | | | | 358/1.9 |
| 2008/0252066 | A1 * | 10/2008 | Rapoport | G06K 19/0614 |
| | | | | 101/211 |
| 2009/0212111 | A1 * | 8/2009 | Krichi | G06K 7/1417 |
| | | | | 235/494 |
| 2012/0153025 | A1 | 6/2012 | Ito et al. | |
| 2014/0036103 | A1 * | 2/2014 | Kuzdeba | H04N 7/002 |
| | | | | 348/222.1 |
| 2014/0261031 | A1 * | 9/2014 | Kellar | B42D 25/382 |
| | | | | 101/211 |
| 2014/0263662 | A1 * | 9/2014 | Anagnostou | H01Q 1/44 |
| | | | | 235/492 |
| 2017/0124442 | A1 * | 5/2017 | Nishizaki | G06K 19/06037 |

* cited by examiner

FIG.3
(a) USING VISIBLE LIGHT
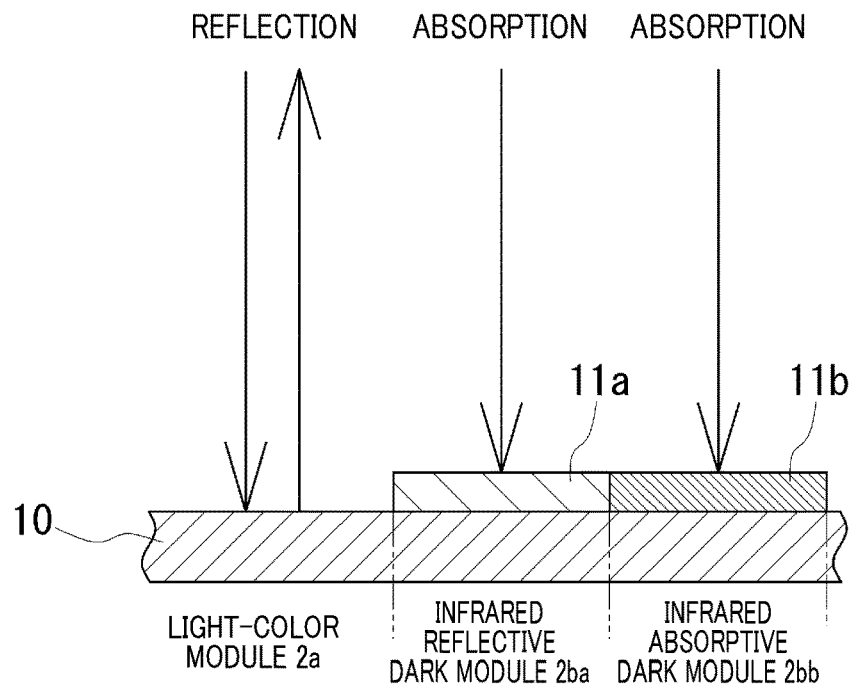
(b) USING INFRARED LIGHT
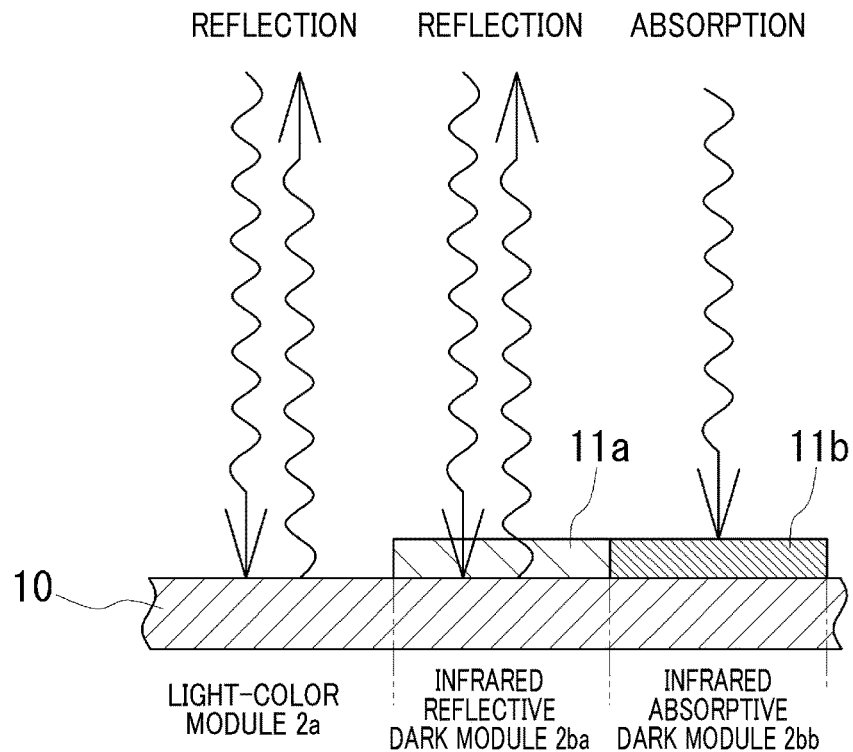

FIG.4

| | REFLECTANCE | | |
| --- | --- | --- | --- |
| | VISIBLE LIGHT | INFRARED LIGHT | |
| | | 880nm | 1000nm |
| LIGHT-COLOR MODULE | HIGH | HIGH | HIGH |
| DARK-COLOR MODULE — INFRARED REFLECTIVE DARK MODULE — FIRST INFRARED REFLECTIVE DARK MODULE | LOW | LOW | HIGH |
| DARK-COLOR MODULE — INFRARED REFLECTIVE DARK MODULE — SECOND INFRARED REFLECTIVE DARK MODULE | LOW | HIGH | HIGH |
| DARK-COLOR MODULE — INFRARED ABSORPTIVE DARK MODULE | LOW | LOW | LOW |

FIG.6
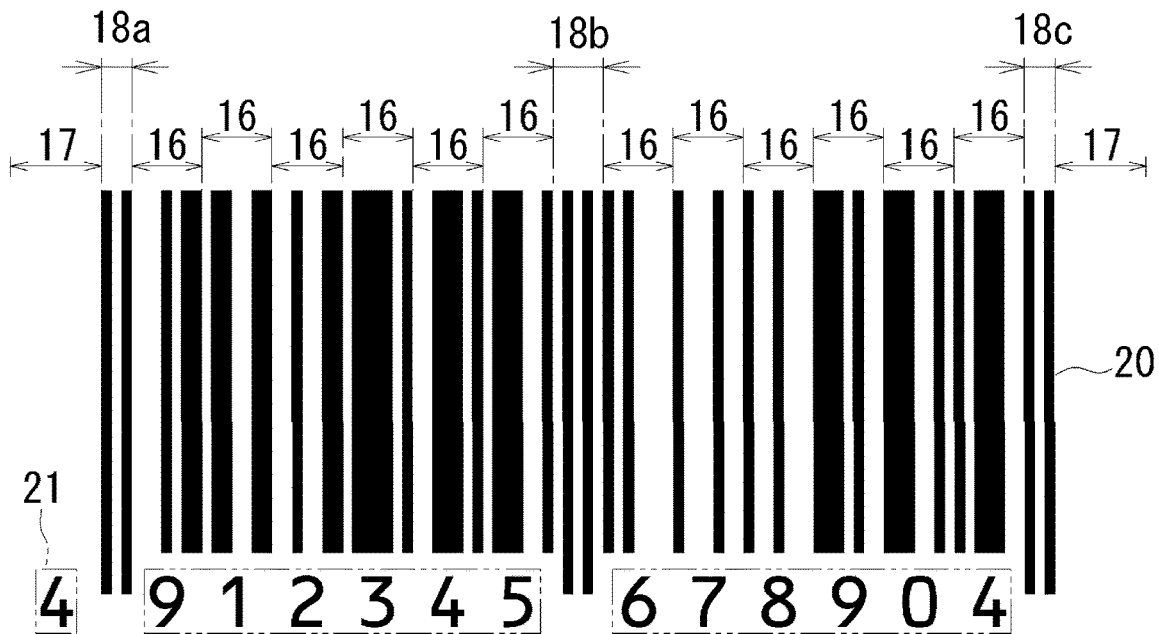
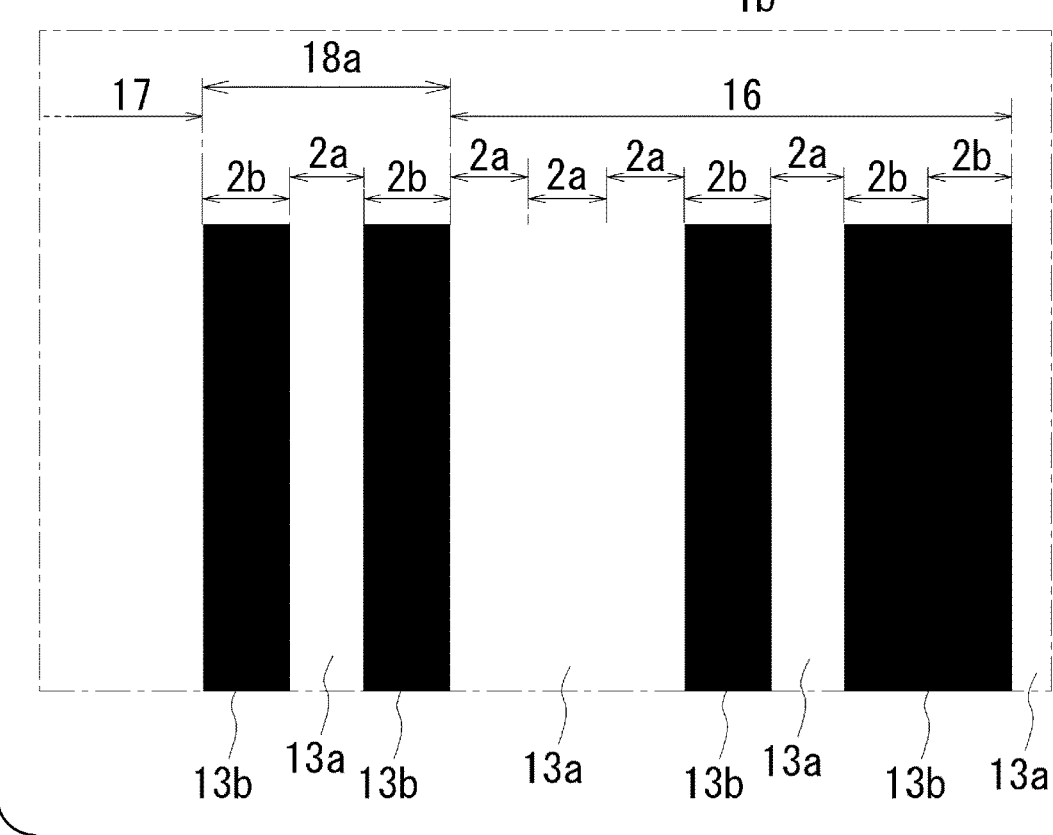

FIG.8
(a) USING VISIBLE LIGHT
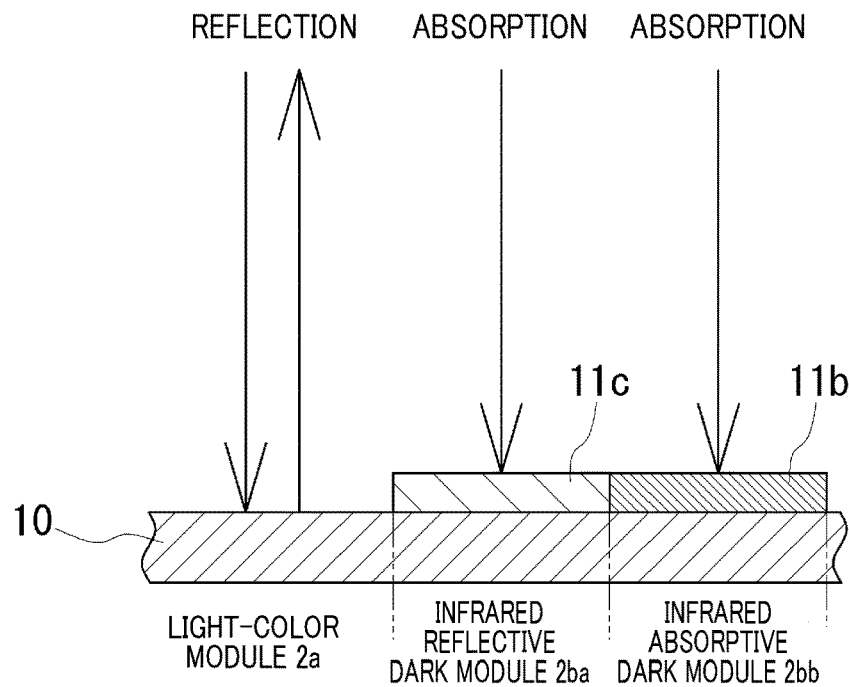
(b) USING INFRARED LIGHT
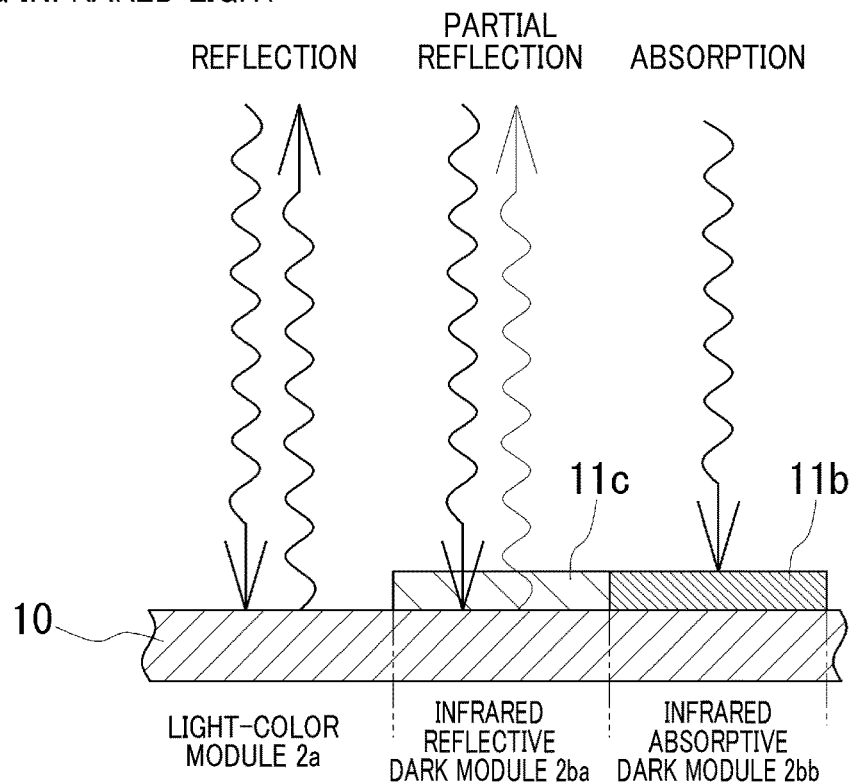

FIG.10
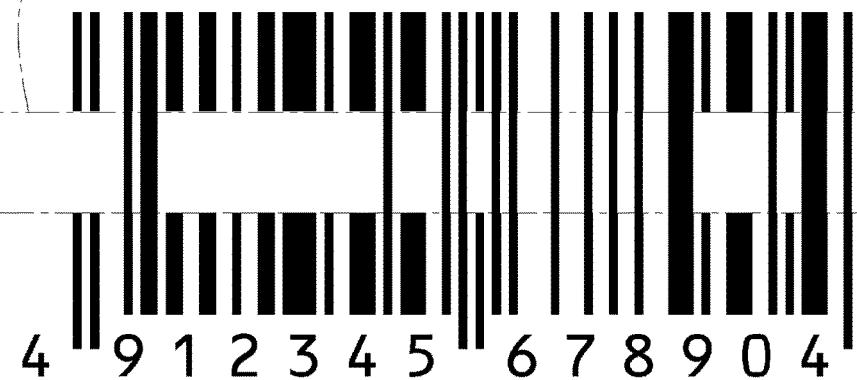

OPTICAL CODE, AND METHOD AND APPARATUS FOR READING OPTICAL CODE

CROSS-REFERENCE TO RELATED APPLICATION

This application is based on and claims the benefit of priorities from earlier Japanese Patent Application Nos. 2015-246195 and 2016-241913 filed Dec. 17, 2015 and Dec. 14, 2016, respectively, the descriptions of which are incorporated herein by reference.

BACKGROUND

Technical Field

The present disclosure relates to an optical code that enables recording of various pieces of information with light-and-dark module patterns and enables optical reading of the recorded information, and relates to applications of the optical code.

Related Art

Optical codes as information codes are used for various purposes. Optical codes, which are generally used for recording information with a light-and-dark module pattern, are roughly categorized into barcodes (one-dimensional codes) in which modules are arrayed in only a horizontal direction, and two-dimensional codes in which modules are arrayed in vertical and horizontal directions in a matrix. A plurality of standards have been established for both the barcodes and the two-dimensional codes. Optical codes with the standards based on the usages of various industries have been adopted and used for many years.

For example, commodity packages sold to general consumers are currently printed using EAN/JAN symbols which are kinds of barcodes. It is so configured that, when an EAN/JAN symbol affixed to a commodity package is read by a POS register at the time of sale, the POS register converts a common product code recorded on the EAN/JAN symbol to a selling price.

Patent document JP 4374331 B discloses a two-dimensional code which is obtained by combining a light-and-dark pattern with a design and colors. Generally used EAN/JAN symbols have a capacity only for recording a common product code. To increase the capacity of recording using EAN/JAN symbols, patent document JP 2938338 B discloses a two-dimensional code having a larger recording capacity than EAN/JAN symbols.

CITATION LIST

Patent Literature

[PTL 1] JP Patent No. 4374331
[PTL 1] JP Patent No. 2938338

It is true that the optical codes of the conventional art increased the capacity of information that can be recorded, owing to the use of two-dimensional codes, but were not able to record information different from the recorded information. The same applies to the two-dimensional codes prepared by using various colors. Specifically, even when the colors are varied, the amount of information recorded in such two-dimensional codes is the same as the amount of information of normally used two-dimensional codes.

SUMMARY

In view of the disadvantages set forth above, it is desired to provide an optical code which is capable of maintaining compatibility with the existing optical codes and capable of recording information different from the information recorded under given conditions, and to provide a method and apparatus enabling reading of the optical code.

An optical code is provided as a first aspect of the present disclosure. The optical code is used for recording first data with a pattern made up of a plurality of light color modules of a light color and a plurality of dark-color modules of a dark color. In the optical code, at least either the light color modules or the dark-color modules include a first module and a second module having difference in reflectance for light of a predetermined wavelength, and second data is recorded in the optical code using patterns of the first module and the second module.

When the first data is recorded in the aforementioned optical code, using a pattern of the light- and dark-color modules according to the existing standards, readers used for the optical codes based on the existing standards can be used for reading the first data ensuring compatibility with the optical codes based on the existing standards.

In a proposed configuration of the first aspect, the light of a predetermined wavelength is invisible light. Generally used copying machines reproduce only visible light reflection characteristics (colors) without considering the reflectance of invisible light by the modules. Therefore, a duplicate obtained by copying the optical code using a copying machine of such a configuration does not include the pattern of the first and second modules and thus the second data is lost. According to the configuration of the present disclosure, correct recording of the second data can be identified to thereby discriminate an original optical code from a duplicate, thereby preventing abuse of the optical code using a copy thereof. The invisible light of a predetermined wavelength may include, for example, ultraviolet light or infrared light. However, preferably, the invisible light of a predetermined wavelength is infrared light. This is because a lighter and smaller irradiator can be produced at low cost when infrared light is used, than using ultraviolet light.

In the first aspect, the first and second modules preferably have equivalent visible light reflection characteristics. This configuration creates difficulty for a visible light image sensor to discriminate between the first and second modules and accordingly secrecy of the second data is enhanced and producing a duplicate of the optical code becomes difficult.

The first aspect proposes a configuration in which the dark-color modules are formed on a front of a light color base layer having high reflectance for visible light and the light of a predetermined wavelength; the first module and the second module are included in the dark-color modules; in a portion for forming the first module, a first dark-color layer is formed on the front of the light color base layer, the first dark-color layer transmitting the light of a predetermined wavelength and having a dark color; in a portion for forming the second module, a second dark-color layer is formed on the front of the light color base layer, the second dark-color layer absorbing the light of a predetermined wavelength and having a dark color; and the first module has higher reflectance for the light of a predetermined wavelength compared to the second module.

The first aspect proposes that the light of a predetermined wavelength is infrared light, the first dark-color layer is formed of an infrared transmissive layer that transmits the light of a predetermined wavelength, and the second dark-color layer is formed of at least an infrared absorptive layer that absorbs the light of a predetermined wavelength.

Such an optical code can be inexpensively produced. Specifically, generally used white color-based paper base material reflects visible light and infrared light. Therefore, the first and second dark-color layers can be easily prepared by printing an infrared transmissive ink and an infrared absorptive ink on the front of the paper base material. General-purpose dye inks are mostly infrared transmissive, and general-purpose pigment inks are mostly infrared absorptive. Accordingly, the light color base layer, the first dark-color layer and the second dark-color layer can all be prepared at low cost.

The first aspect proposes a configuration in which the dark-color modules are formed on the front of the light color base layer having high reflectance for visible light and the light of a predetermined wavelength; the first module and the second module are included in the dark-color modules; in a portion for forming the first module, a first dark-color layer is formed on the front of the light color base layer, the first dark-color layer partially transmitting the light of a predetermined wavelength and having a dark color; in a portion for forming the second module, a second dark-color layer is formed on the front of the light color base layer, the second dark-color layer absorbing the light of a predetermined wavelength and having a dark color; and the first module has higher reflectance for the light of a predetermined wavelength compared to the second module, and having lower reflectance for the light of a predetermined wavelength compared to the light color modules.

With this configuration, the light color module, the first module and the second module can be discriminated from each other based on the reflectance of the light of a predetermined wavelength. Accordingly, by measuring the reflectance of the light of a predetermined wavelength for each module, the first data and the second data can be read without measuring the reflectance of visible light.

The first aspect proposes that the light color modules are white, and the dark-color modules are black. With this configuration, the optical code of the present disclosure appears to be similar, with the naked eye, to the generally used existing optical codes, and accordingly is naturally accepted by consumers or the like.

The first aspect proposes a configuration in which the light of a predetermined wavelength is visible light. With this configuration, the first modules will have a different color from the second modules so that the first modules are discriminated from the second modules. Accordingly, a smartphone or the like installed with dedicated software can be used as a reader for reading the first and second data.

The first aspect proposes that the optical code is a barcode in which light color parallel bars made up of the light color modules, and dark-color parallel bars made up of the dark-color modules are arrayed in a row in a reading direction.

As described above, barcodes (one-dimensional barcodes) have a limited recording capacity compared to two-dimensional codes. Accordingly, applying the present disclosure to barcodes, recording capacity is greatly increased.

The first aspect proposes a configuration in which the first modules and the second modules are included in the dark-color modules, the optical code includes margins on both sides, the margins having high reflectance for the light of a predetermined wavelength and having a light color, and the dark-color parallel bars provided on both ends are formed of either the first module or the second module whichever has low reflectance for the visible light of a predetermined wavelength.

With this configuration, measurement of the reflectance of the light of a predetermined wavelength can clearly specify the barcodes on both ends according to the difference in the reflectance. Accordingly, the accuracy of reading the first and second modules is improved.

The first aspect proposes that the array of the light color parallel bars and the dark-color parallel bars is made up of two rows of modules arranged in a reading direction, and the second data are recorded in the respective rows of modules, the second data depending on patterns of the first modules and the second modules, and identifier patterns are recorded in respective portions where patterns of the light color modules and the dark-color modules are fixed, the identifier patterns being recorded in respective patterns of the first module and the second module to distinguish the two rows of modules from each other.

With this configuration, the amount of recording of the second data is increased. Since the identifier patterns for discrimination are recorded in the respective rows of modules, the second data recorded in the respective rows of modules are correctly read.

The first aspect proposes a configuration in which a barcode includes a barcode body made up of the light color parallel bars and the dark-color parallel bars, and visually recognizable numbers provided below the barcode body to indicate the first data, the visually recognizable numbers including a first number and a second number having different reflectance for the light of a predetermined wavelength; and third data is recorded with a pattern of the first number and the second number.

With this configuration, compatibility with the barcodes based on the existing standards is retained, and the capacity of the barcode is further increased.

The first aspect proposes a configuration in which the optical code is affixed to at least any of a product, a product package and a product tag, and the second data includes information used for commodity management and identification information indicating a type of the information.

With this configuration, the information according to the type of the characteristics of a product is selectively recorded as the second data and thus the convenience as an optical code used for commodity management is improved.

A method of producing the optical code of the first aspect is provided as a second aspect. The method includes a first step of determining a pattern of the light color modules and the dark-color modules for recording the first data; a second step of determining a pattern of the first module and the second module for recording the second data; and a third step of performing mask processing with a predetermined mask pattern with respect to the pattern of the first module and the second module determined in the second step to partially reverse the pattern of the first module and the second module.

According to this method, part of the pattern of the first and second modules is reversed through mask processing to eliminate imbalance between the first module and the second module. Resultantly, the first and second modules are more correctly read. When the mask pattern used for the mask processing is disclosed to limited persons, secrecy of the second data is kept.

When the optical code related to the first aspect is read, a method of reading an optical code is provided as a third aspect. For the configuration in which the light of a predetermined wavelength is invisible light, the reading present method includes: a visible light image capture step of capturing an image of the optical code with the visible light; an invisible light image capture step of capturing an image of the optical code with the light of a predetermined wavelength; a visible light discrimination step of discriminating at least part of modules included in the optical code, as to whether each of the modules is the light color module or the dark-color module, based on the image captured in the visible light image capture step; an invisible light discrimination step of discriminating at least part of modules included in the optical code, as to whether each of the modules has high reflectance or low reflectance for the light of a predetermined wavelength, based on the image captured in the invisible light image capture step; an invisible light module discrimination step of discriminating at least part of modules, as to whether each of the modules is the first module or the second module, based on the results of the visible light discrimination step and the invisible light discrimination step; a first decryption step of decrypting the first data, based on the results of the visible light image capture step; and a second decryption step of decrypting the second data, based on an outcome of the invisible light module discrimination step.

With this method, the optical code of the present disclosure is easily read.

For the configuration in which the light of a predetermined wavelength is visible light, the method of reading of the third aspect includes a step of visible light image capture of capturing an image of the optical code with the visible light; a first discrimination step of discriminating at least part of modules included in the optical code, as to whether each of the modules is the light color module or the dark-color module, based on the results of the visible light image capture step; and a second discrimination step of measuring frequency distribution of intensity of the light of a predetermined wavelength, based on the image captured in the visible light image capture step, determining a threshold intensity of the light of a predetermined wavelength, based on the frequency distribution, and discriminating between the first module and the second module included in the image captured in the visible light image capture step, based on the threshold.

With this method, one time image capture can be performed, enabling correct discrimination between the first module and the second module.

A reader for reading a barcode as an optical code is provided as a fourth aspect. Specifically, this reader includes light color parallel bars made up of a plurality of light color modules of a light color, and dark color parallel bars made up of a plurality of dark color modules of a dark color, the light color parallel bars and the dark color parallel bars being arrayed in a row in a reading direction, the barcode being used for recording first data with a pattern of the light color modules and the dark color modules, and second data with a pattern of a first modules and a second module having different reflectance for invisible light of a predetermined wavelength and included in the dark color modules. The reader includes an irradiator that irradiates visible light and the invisible light of a predetermined wavelength; an imaging unit that captures an image with light that is a reflection of light irradiated to the barcode by the irradiator; and an invisible light partial filter that is arranged to shield the visible light for light reflected from part of an imaging area of the imaging unit and transmit the invisible light of a predetermined wavelength for reception by the imager, and transmit visible light for reception by the imaging unit for light reflected from an area other than the part of area of the imaging area. In the reader, the imaging unit includes: an invisible light recorded data reading part that reads the first data, based on a pattern of modules obtained from light that is produced by reflection of the visible light reflected from an area other than the part of area of the imaging area; and an invisible light recorded data reading part that reads the second data, based on a pattern of modules obtained from light that is reflection of the invisible light of a predetermined wavelength form the part of area of the imaging area.

With this reader, decryption can be performed with only a single image capture time of the first and second data recorded in the barcode.

A reader for reading a barcode as an optical code is provided as a fifth aspect. Specifically, this reader includes light color parallel bars made up of a plurality of light color modules of a light color, and dark color parallel bars made up of a plurality of dark color modules of a dark color, the light color parallel bars and the dark color parallel bars being arrayed in a row in a reading direction, the barcode being used for recording first data with a pattern of the light color modules and the dark color modules, and second data with a pattern of a first module and a second module having different reflectance for invisible light of a predetermined wavelength and included in the dark color modules. The reader includes an irradiator that irradiates visible light and the invisible light of a predetermined wavelength; and an imaging unit that captures an image with light that is reflection of light irradiated to the optical code by the irradiator. In the reader, the irradiator irradiates the invisible light of a predetermined wavelength to a part of area of an imaging area of the imaging unit, without irradiating visible light, and irradiates visible light to an area other than the part of area of the imaging area; and the imaging unit includes: an invisible light recorded data reading part that reads the first data, based on a pattern of modules obtained from light that is reflection of the visible light reflected from an area other than the part of area of the imaging area; and an invisible light recorded data reading part that reads the second data, based on a pattern of modules obtained from light that is reflection of the invisible light of a predetermined wavelength form the part of area of the imaging area.

With this reader, capture of only one time image capture of the first and second data recorded in the barcode enables decryption.

BRIEF DESCRIPTION OF THE DRAWINGS

In the accompanying drawings:

FIG. 3 illustrate characteristics of modules;

FIG. 4 is a table showing characteristics of modules, according to a third embodiment of the present disclosure;

FIG. 6 shows an optical code 1*b*, in which FIG. 6, (a), is a diagram illustrating the optical code according to a fourth embodiment and FIG. 6, (b), is an enlarged view illustrating an upper-left portion of the optical code of the fourth embodiment;

FIG. 8 illustrates characteristics of modules according to an eighth embodiment of the present disclosure;

FIG. 9 illustrates an optical code, in which FIG. 9, (a), is a diagram illustrating a method of imaging the optical code 1b using a dedicated reader according to a tenth embodiment and FIG. 9, (b), is a diagram illustrating an image 26 of the optical code 1b captured by a dedicated reader according to a ninth embodiment;

FIG. 10 illustrates an optical code, in which FIG. 10, (a) is a diagram illustrating a method of imaging the optical code 1b using a dedicated reader according to an eleventh embodiment and FIG. 10, (b), is a diagram illustrating an image 26 of the optical code 1b captured by the dedicated reader of the eleventh embodiment;

DETAILED DESCRIPTION OF THE PREFERRED EMBODIMENTS

With reference to the accompanying drawings, hereinafter will be described various embodiments of an optical code as information, and method and apparatus for reading the optical code, according to the present disclosure.

First Embodiment

An optical code according to a first embodiment will be described.

An optical code 1 of the present embodiment is affixed to medication packaging boxes and used for commodity management. The optical code 1, when read in visible light, is compatible with a QR code (registered trademark) which is most widespread among two-dimensional codes (or two-dimensional information codes). The optical code 1 has a basic structure based on the QR code. Specifically, as shown in (a) of FIG. 1, the optical code 1 of the present embodiment is provided with square modules 2 which are arranged in a 21×21 matrix. The modules 2 include light color (white) modules 2a arranged to increase reflectance of visible light, and dark color (black) modules 2b arranged to decrease reflectance of visible light. Data is recorded in the optical code 1 with a pattern of the light color modules 2a and the dark color modules 2b.

Figure 1:
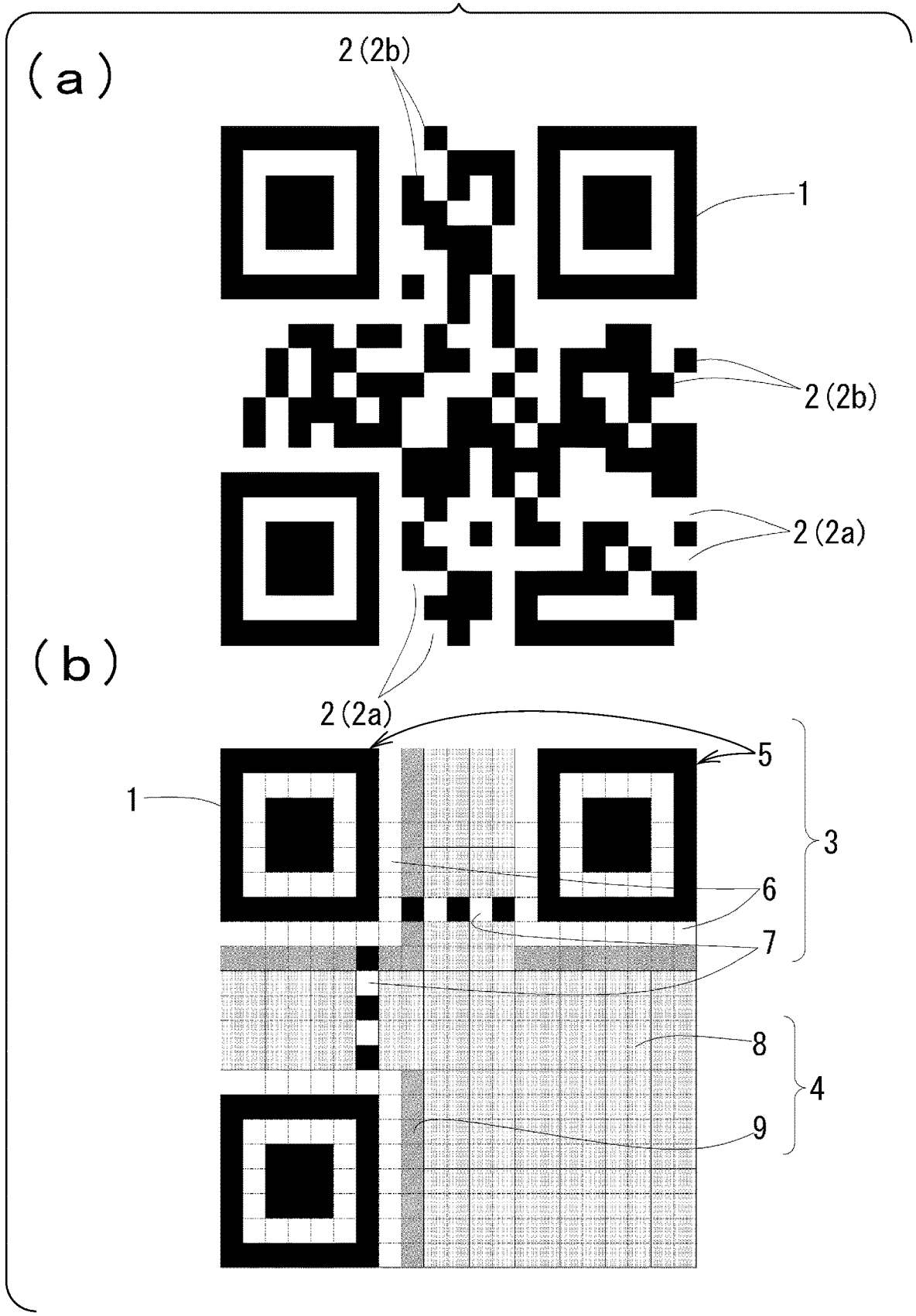
FIG. 1 shows optical codes, in which FIG. 1, (a), is a diagram illustrating an optical code 1, according to a first embodiment and FIG. 1, (b), is a diagram illustrating the optical code 1 of the first embodiment in which regions are indicated with function-specific pattern-codes.

As shown in (b) of FIG. 1, the optical code 1 is configured, similarly to the QR code, by a functional pattern (fixed region) 3 and an encoded data region 4. The functional pattern 3 corresponds to a region of the QR code where the positions of the light color modules 2a and the dark color modules 2b are predetermined. The functional pattern 3 is configured by a position detection pattern 5, a separation pattern 6, a timing pattern 7, and the like, which assist optical reading of the optical code 1. The encoded data region 4 corresponds to a region where data is recorded with a pattern of the light- and cark-color modules 2a and 2b. The encoded data region 4 is configured by a data code region 8 where data codewords and error codewords are recorded, and a format information code region 9 where codes indicating format information are arranged. Since this configuration is based on the JIS standard (JIS X 0510: 2004) of QR code, specific description is omitted.

Figure 2:
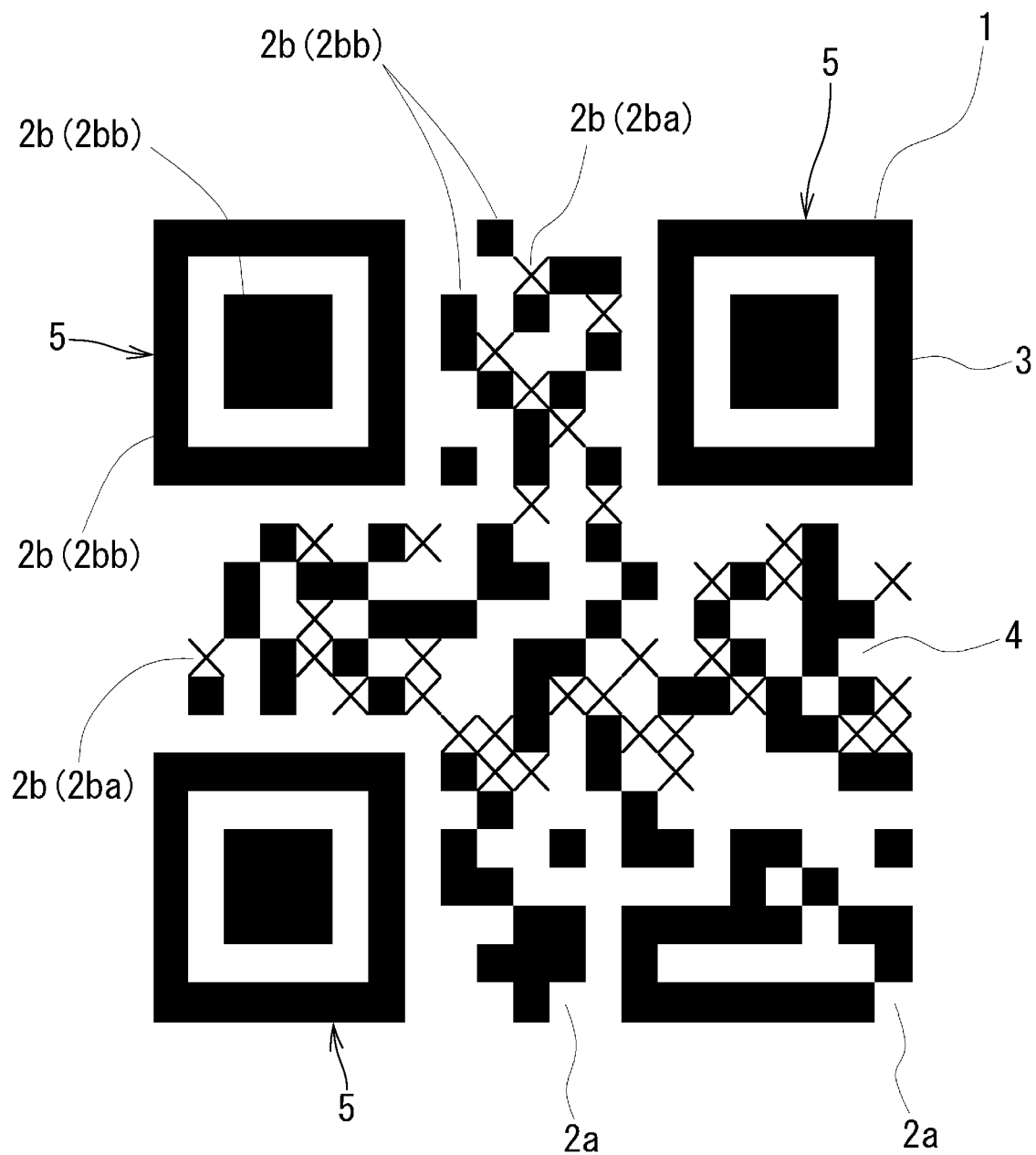
FIG. 2 is a diagram illustrating the optical code 1 of the first embodiment, in which infrared reflective dark modules 2*ba* are discriminated from infrared absorptive dark modules 2*bb*.

The dark color modules 2b of the optical code 1 of the present embodiment are made up of infrared light reflecting dark color modules 2ba (hereinafter simply referred to as infrared reflective dark modules 2ba) having high reflectance for infrared light with a wavelength of 1,000 nm as invisible light (hereinafter simply referred to infrared light except for third embodiment), and infrared light absorbing dark color modules 2bb (hereinafter simply referred to as infrared absorptive dark modules 2ba) having low reflectance for infrared light. Specifically, in FIG. 2, those modules which are represented by white are light color modules 2a, those which are represented by a mark "x" are infrared reflective dark modules 2ba, and those which are represented by black are infrared absorptive dark modules 2bb.

The infrared reflective dark module 2ba preferably has an infrared reflectance of 75% or more, while the infrared absorptive dark module 2bb preferably has an infrared reflectance of 25% or less. In the present embodiment, the dark color modules 2b configuring the functional pattern 3 are all infrared absorptive dark modules 2bb. The dark color modules 2b included in the encoded data region 4 are made up of the infrared reflective dark modules 2ba and the infrared absorptive dark modules 2bb. The infrared reflective dark module 2ba is clearly discriminated from the infrared absorptive dark module 2bb by measuring infrared reflection characteristics. However, the both being black and having equivalent visible light reflection characteristics, they are difficult to discriminate from each other.

The light color modules 2a are only made up of those modules which have high reflectance for visible light and infrared light. Specifically, in the modules 2 of the optical code 1 of the present embodiment, the light color modules 2a having high visible light reflectance can be discriminated from the dark color modules 2b having low visible light reflectance by measuring visible light reflectance (brightness). Further, the infrared absorptive dark modules 2bb having low infrared reflectance can be discriminated from other modules (the light color modules 2a and the infrared reflective dark modules 2ba) having high infrared reflectance.

The optical code 1 of the present embodiment is prepared by forming layers of black inks 11a and 11b by printing on a surface of a white paper base material 10 configuring the packaging box. Specifically, as shown in (a) of FIG. 3, the surface of the paper base material 10 includes an exposed portion where the black inks 11a and 11b are not printed to serve as the light color module 2a with high visible light reflectance, and includes a portion where layers of the black inks 11a and 11b are formed to serve as the dark color module 2b with low visible light reflectance.

The black inks 11a and 11b are specifically two kinds of inks, i.e. infrared transmissive black ink 11a that transmits infrared light and infrared absorptive black ink 11b that absorbs infrared light. The paper base material 10 has high reflectance for visible light and infrared light. As shown in FIG. 3B, the portion formed with a layer of the infrared transmissive black ink 11a (corresponding to the first dark color layer of the present disclosure) serves as the infrared reflective dark module 2*ba* where infrared light transmits through the ink 11*a* and reflected by the paper base material 10.

On the other hand, the portion formed with a layer of the infrared absorptive black ink 11*b* (corresponding to the second dark color layer of the present disclosure) serves as the infrared absorptive dark module 2*bb* where infrared light is absorbed by the ink 11*b*. White paper base materials generally have high infrared reflectance, and black dye inks generally transmit infrared light, and black pigment inks generally absorb infrared light. Accordingly, the optical code 1 of the present embodiment can be prepared by using generally used materials.

The optical code 1 of the present embodiment is provided with two kinds of areas where data are recorded. One is a visible light recording area (hereinafter referred to as visible recording area) for recording data using a pattern of the light color modules 2*a* and the dark color modules 2*b* in the encoded data region 4. The other is an infrared light recording area (hereinafter referred to as infrared recording area) for recording data using a pattern of the infrared reflective dark modules 2*ba* and infrared absorptive dark modules 2*bb* in the encoded data region 4.

The visible recording area is used for recording product information used for commodity management. The product information includes a manufacturer ID, product identifier code, expiration date, lot number, and serial number. The product information is based on GS1 identifier code standards. The information included in the product information is not limited to the above information but may be changed as appropriate. The product information recorded on the visible recording area is recorded according to QR code standards.

When the optical code 1 of the present embodiment is read by a generally used QR code reader (e.g., a smartphone), the light color module 2*a* is discriminated as a light color module, while the dark color module 2*b* is identified as a dark color module. This is because such a generally used QR code reader identifies light and dark in each module 2 based on only the reflection characteristics (value levels) of visible light. Thus, the product information recorded on the visible recording area of the optical code 1 can be read by generally used QR code readers. In this way, the optical code 1 of the present embodiment, when read with visible light, is compatible with a AR code.

The infrared recording area is used for recording a proper product identifier code that indicates the product is proper. Specifically, the infrared recording area is used for recording binary data which is obtained by encoding a proper product identifier code with ASCII code, encrypting the encoded code, and then further imparting an error correction code to the encrypted code. The binary data is recorded in the infrared recording area with a pattern of the infrared reflective dark modules 2*ba* and the infrared absorptive dark modules 2*bb*. Accordingly, the proper product identifier code recorded in the infrared recording area can be measured for infrared reflectance, and can be read only by a dedicated reader in which a decryption key is recorded to decrypt the encrypted proper product identifier code. In this way, the infrared recording area has characteristics as a secret where recorded information can be read only by a special reader.

When the optical code 1 of the present embodiment is copied by a copying machine, the infrared reflective dark modules 2*ba* and the infrared absorptive dark modules 2*bb* are recognized to be the same black (dark) color because the scanner incorporated in the copying machine does not measure the infrared reflection characteristics. Accordingly, in the copy made by the copying machine, all the dark color modules 2*b* are printed in black using the same ink.

Generally used copying machines include those which print black color using an infrared transmissive ink (dye ink usually), and those which print black color using an infrared absorptive ink (pigment ink usually). The optical code that has been copied using whichever of these types of copying machines loses the infrared reflective dark modules 2*ba* and the infrared absorptive dark modules 2*bb* provided to the optical code 1 that is the original copy. Therefore, the data recorded in the infrared recording area is lost. Thus, when a dedicated reader is used to determine whether a proper product identifier code is recorded in the infrared recording area, the original copy of the optical code 1 of the present embodiment can be discriminated from a copy (duplicate) thereof.

In this way, data is recorded on the optical code 1 of the present embodiment with a pattern of the infrared reflective dark modules 2*ba* and the infrared absorptive dark modules 2*bb*. This configuration provides an advantage of recording high secrecy data which is difficult to be read by generally used QR code reader and difficult to be copied by copying machines, besides the data recorded with a pattern of the light- and dark color modules 2*a* and 2*b*.

The optical code 1 of the present embodiment can be prepared, for example, using a method including the following steps.

(1) Preparation of Data to be Recorded

Data (product information) to be recorded in the visible recording area is prepared.

(2) Preparation of Data Based on QR Code

A QR code is prepared to record product information prepared in step (1). Specifically, a pattern of the light- and dark color modules 2*a* and 2*b* in the optical code 1 is determined. Since this step can be realized according to well-known QR code preparing methods, detailed description is omitted.

(3) Preparation of Data to be Recorded in the Infrared Recording Area

Data (proper product identifier code) to be recorded in the infrared recording area is prepared. Specifically, a proper product identifier code is encoded, encrypted, and imparted with an error correction code.

(4) Determination of Infrared Reflective Dark Modules and Infrared Absorptive Dark Modules For each dark color module 2*b* determined in step (2), it is determined whether the dark color module 2*b* is used as an infrared reflective dark module 2*ba* or an infrared absorptive dark module 2*bb*. Specifically, one bit of binary data in the data (proper product identifier code) prepared in step (3) is recorded in one dark color module 2*b* of the encoded data region 4. If the bit to be recorded indicates 1, the dark color module 2*b* in question is determined to be an infrared reflective dark module 2*ba*, and if the bit to be recorded indicates 0, the dark color module 2*b* in question is determined to be an infrared absorptive dark module 2*bb*. In this step, all the modules 2 for a pattern are determined. Which one of the dark color modules 2*b* in the encoded data region 4 should be used for recording each bit of the binary data is determined as appropriate. For example, the dark color modules 2*b* in the encoded data region 4 may be ranked from the left-end one on the topmost row, and the binary data may be sequentially recorded bit by bit from the highest-order dark color module 2*b*. Alternatively, by performing interleaving, the binary data may be recorded every fixed number of dark color modules 2*b*.

(5) Printing

The optical code 1 is printed onto the white paper base material 10 configuring a packaging box, using the black inks 11a and 11b. Specifically, a layer of the infrared transmissive black ink 11a is formed on the front surface of the paper base material 10 to print thereon the black infrared reflective dark modules 2ba. Also, a layer of the infrared absorptive black ink 11b is formed on the front surface of the paper base material 10 to print thereon the black infrared absorptive dark modules 2bb. The light color modules 2a are formed by the paper base material 10 exhibiting the white color on the surface. The printing step may be performed using a plate, or may be performed using a printer (ink-jet printer or laser printer).

The following description addresses a specific method of using the optical code 1 of the present embodiment.

As mentioned above, the optical code 1 of the present embodiment is printed on medication packaging boxes, with product information being recorded on the visible recording area, and a proper product identifier code being recorded on the infrared recording area. Generally, medications are distributed in the order of manufacturers to wholesalers, then to medical institutions or pharmacies, then to consumers. A medication with the optical code printed on its packaging box is subjected to commodity management through reading of the product information recorded on the visible recording area of the optical code 1, at the time of shipment from the manufacturer, at the time of reception and shipment by the wholesaler, at the time of reception at the medical institution or the pharmacy, at the time of selling to a consumer, and the like. The data in the visible recording area is readable by generally used QR code readers, and therefore basic commodity management can be conducted by using moderately priced readers.

Distribution of improper products (counterfeit products) of medications is a serious problem, and therefore mingling of improper products during distribution of products is required to be prevented. A medication with the optical code 1 printed on its packaging box enables verification as to the authenticity of the product by determining whether the optical code 1 on the packaging box is a duplicate, based on the presence/absence of a proper product identifier code.

The optical code 1 of the present embodiment is used for recording product information for use in commodity management. Accordingly, when the product information is read concurrently with authenticating the optical code 1, based on the presence/absence of a proper product identifier code, the task of verifying the properness of the product can be concurrently performed with the task of verifying the product information. For example, use of a dedicated reader, which will be described below, enables both the task of reading the product information and the task of verifying the properness of the product, at one time.

Figure 14:
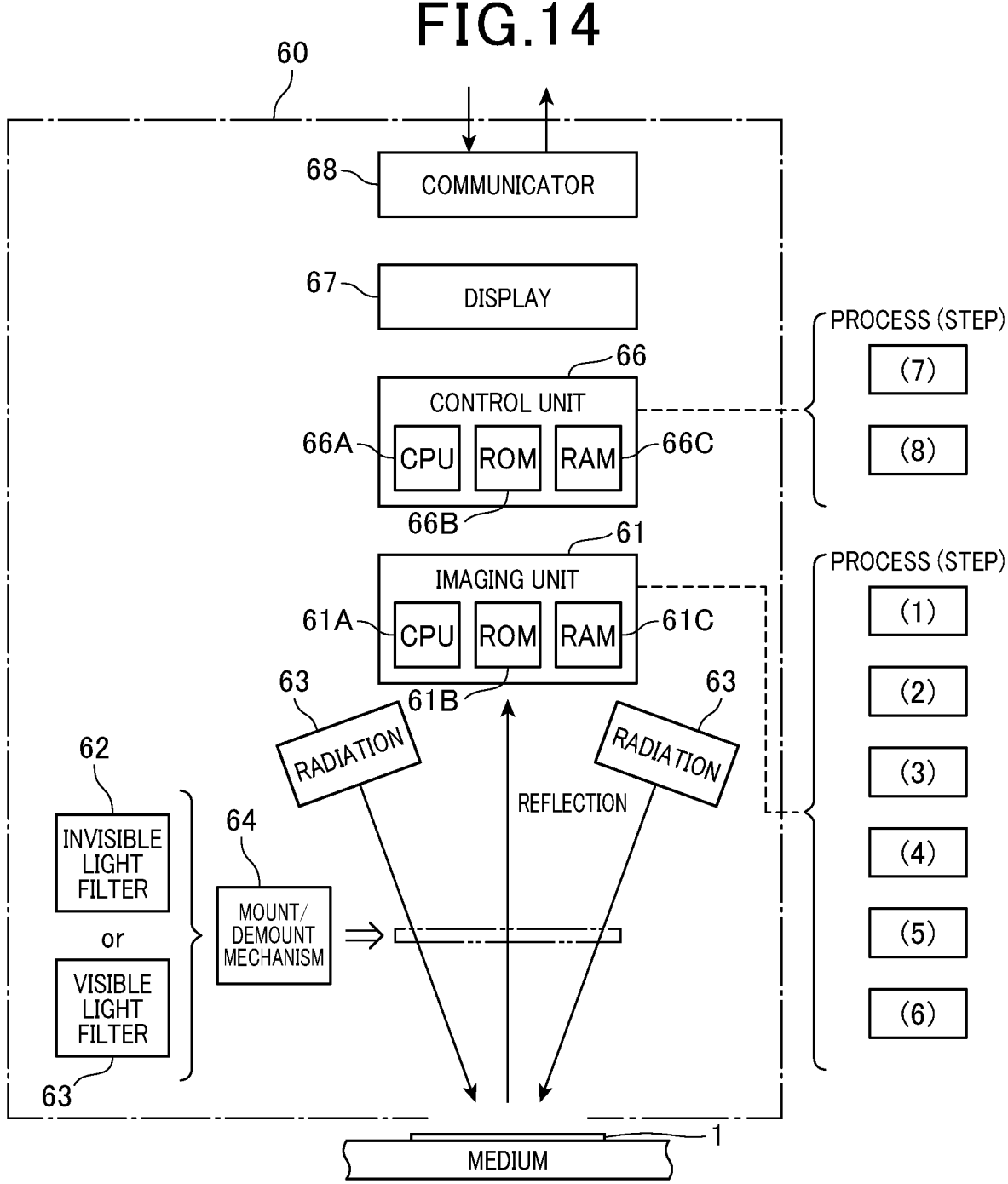
FIG. 14 is a schematic block diagram illustrating the dedicated reader of the optical code of the first embodiment, together with functional processes (steps) performed by a control unit and an imager of the dedicated reader.

Referring now to FIG. 14, hereinafter will be described a dedicated reader 60 which enables the task of reading product information concurrently with the task of verifying properness of the product.

As shown in FIG. 14, the dedicated reader 60 includes an imaging unit 61, an infrared filter 62, a visible light filter 63, a mount/demount mechanism 64, an irradiator 65, a control unit 66, a display 67, and a communicator 68. The imaging unit 61 includes an imaging device that can detect visible light and infrared light. The infrared filter 62 shields visible light to transmit infrared light (invisible light). The visible light filter 63 shields infrared light to transmit visible light. The mount/demount mechanism 64 selectively mounts/demounts the infrared filter and the visible light filter to/from a light path. The irradiator 65 irradiates infrared light and visible light. The control unit 66 controls imaging and data processing. The display 67 displays various pieces of information. The communicator 68 outputs data to the outside.

The imaging unit 61 and the control unit 66 each has a configuration as a computer including, for example, ROM (read only memory) 61B (66B) and RAM (random access memory) 61C (66C), in addition to CPU (central processing unit) 61A (66A) performing arithmetic processing. The ROM is a recording medium that serves as a non-transient computer readable recording medium and is stored in advance with a program for reading or processing data needed by the ROM. The CPU, when started, reads a necessary program from the ROM into a work area of the CPU to command reading according to the procedure described in the program, or to process data. As a matter of course, data can be stored in the ROM. The RAM is used as a temporary memory area for the data used in the processing performed by the CPU. The CPUs of the imaging unit 61 and the control unit 66 each perform processes to functionally process the tasks or steps assigned by a program (the functional processing unit mentioned above). The imaging unit 61 and the control unit 66 may be integrated and designed as a single computer system.

The dedicated reader 60 sequentially executes the task of reading product information and the task of verifying properness of the product, according to the following procedure. Specifically, as shown in FIG. 14, the following processes (1) to (6) are performed by the imaging unit 61 (i.e. CPU 61A). Further, the following processes (7) and (8) are performed by the control unit 66 (i.e. CPU 66A).

(1) Visible Light Image Capture Process (Configuring a Functional Processing Unit or Step)

A visible light image of the optical code 1 on a support (medium) that holds the code is captured. Specifically, an image of the optical code 1 is captured in a state in which the infrared filter is demounted from the light path and the visible light filter is mounted to the light path. As necessary, visible light is irradiated to the optical code 1 from the irradiator.

(2) Infrared Light Image Capture Process (Configuring a Functional Processing Unit or Step)

An infrared image of the optical code 1 is captured. Specifically, an image of the optical code 1 is captured in a state in which the visible light filter is demounted from the light path and the infrared filter is mounted to the light path. As necessary, infrared light is irradiated to the optical code 1 from the irradiator.

(3) Visible Light Reflection Characteristics Discrimination Process (Configuring a Functional Processing Unit or Step)

Based on the image captured in the visible light image capture process, each of the modules 2 configuring the optical code 1 is specified to discriminate whether the module 2 is a light color module 2a or a dark color module 2b. This step can be achieved by using a well-known QR code reading method.

(4) Product Information Reading Process (Configuring a Functional Processing Unit or Step)

The product information recorded in a pattern of the light- and dark color modules 2a and 2b in the encoded data region 4 is read. This step can be achieved by using a well-known QR code reading method.

(5) Infrared Reflection Characteristics Discrimination Process (Configuring a Functional Processing Unit or Step)

Based on the image captured in the infrared light image capture process, each of the modules 2 configuring the optical code 1 is specified to discriminate whether the module 2 has high infrared reflectance (the light color module 2a and the infrared reflective dark module 2ba) or has low infrared reflectance (the infrared absorptive dark module 2ba). Then, the result of the discrimination is combined with the result of the discrimination of the visible light reflection characteristics process to thereby discriminate whether each of the modules 2 of the optical code 1 is the light color module 2a, or the infrared reflective dark module 2ba, or the infrared absorptive dark module 2bb. Based on the infrared image, the position specification of each module 2 is attempted several times. If the position is not specified, the process directly proceeds to the subsequent authentication process. In the infrared reflection characteristics discrimination process, the position of each module 2 in the infrared image is detected based on the functional patterns 3 included in the image. This is because the infrared image includes the functional patterns 3 sufficiently to enable detection of each module 2, although the upper-left position detection pattern 5 is incomplete.

(6) Infrared Recording Area Reading Process (Configuring a Functional Processing Unit or Step)

Data recorded in a pattern of the infrared reflective dark modules 2ba and the infrared absorptive dark modules 2bb is read. Specifically, an error correction code is used for the detection/correction of an error, and encrypted data is decrypted.

(7) Authentication Process (Configuring a Functional Processing Unit or Step)

The data recorded in the infrared recording area is checked against the proper product identifier code recorded in advance in the dedicated reader. If the data is identical with the proper product identifier code, the product in a packaging box affixed with the optical code in question is determined to be a proper product. However, if the data recorded in the infrared recording area is not identical with the proper product identifier code or unreadable, or if segmenting of the modules 2 configuring the optical code 1 is unsuccessful in the infrared reflection characteristics discrimination process, although reading of the product information has been successful in the product information reading process, the product in a packaging box affixed with the optical code in question is determined to be an improper product.

(8) Results Output Process (Configuring a Functional Processing Unit or Step)

The product information read in the product information reading process and the result of the determination made in the authentication process are displayed on the display and outputted to the outside via the communicator.

As described above, generally used QR code readers can be used for reading the product information recorded on the optical code 1 of the present embodiment affixed to a packaging box of a medicament. Accordingly, the product information recorded in the optical code 1 can be read in each stage of distribution at low cost to thereby manage commodity products.

In reading the optical code 1 of the present embodiment, it is determined whether a proper product identifier code is recorded in the infrared recording area to detect a duplicate of the optical code 1. Accordingly, improper products using a packaging box affixed with a duplicate of the optical code 1 are appropriately prevented from being distributed.

Product information is required to be read in each stage of distribution from substantially all the products. However, the task of verifying properness of product is not necessarily performed in all the stages of the distribution, but may be performed in an unannounced or random inspection with respect to part of products, which will exert an effect of a satisfactory level. Thus, the task of verifying properness of product only has to be performed less frequently than the task of product information reading. In this way, determining a duplicate of the optical code 1 of the present embodiment involves use of a dedicated reader that can measure infrared reflectance, but can be performed less frequently at low cost.

The optical code 1 of the present embodiment includes product information recorded and used for commodity management. Further, when performing commodity product management in the medication distribution, the product information recorded in the visible recording area is read concurrently with verifying the proper product identifier code recorded in the infrared recording area. Accordingly, the optical code 1 of the present embodiment has an advantage of simplifying the task of verifying the properness of products.

In the present embodiment, it is determined whether a proper product identifier code is recorded in the infrared recording area to detect a forged optical code including falsified product information. To falsify the product information, the positions of the light- and dark color modules 2a and 2b have to be changed. However, the forged optical code including positionally changed light- and dark color modules 2a and 2b will lose the proper product identifier code recorded in the dark color modules 2b and thus the forged optical code can be detected. In this way, the configuration of the present embodiment can impose appropriate and strict controls upon distribution of duplicates of the optical code 1, and forged optical codes including falsified data of the optical code 1.

The optical code 1 of the present embodiment includes the functional pattern 3 in which all the dark color modules 2b are infrared absorptive dark modules 2bb. As a result, an image of the optical code 1 captured with infrared light includes a photograph of the functional pattern 3, as it is, formed by the light- and dark color modules 2a and 2b. Thus, the present embodiment has an advantage of enabling easy specification of the modules 2, based on the functional pattern 3 included in an image of the optical code 1 captured with infrared light.

In the authentication process of the present embodiment, the optical code 1 is determined to be proper if a proper product identifier code is recorded in the infrared recording area. Alternatively to this way of determination, the optical code may be determined to be valid if the dark color modules 2b in the encoded data region 4 are configured by two kinds of modules, i.e. the infrared reflective and absorptive dark modules 2ba and 2bb.

In the present embodiment, only a proper product identifier code is recorded in the infrared recording area, for use in authentication. However, other information may also be recorded in the infrared recording area.

Second Embodiment

With reference to the drawings referred to in the first embodiment, a second embodiment will be described.

In the present embodiment, part of the components of the first embodiment has been changed. Therefore, description on the components common to the first embodiment is omitted.

The optical code of the present embodiment is characterized in that the code enables recording a serial code of the product in the infrared recording area. The serial code of the product is also included in the product information in the visible recording area. Therefore, the optical code of the present embodiment includes the serial code of the product recorded in both the visible light recording area and the infrared recording area.

In the optical code of the present embodiment, the serial code recorded in the visible recording area is checked against the serial code recorded in the infrared recording area. If there is a match between the serial codes, the optical code is determined to be proper. Similarly to the first embodiment, a pattern of the infrared reflective and absorptive dark modules 2ba and 2bb is lost in a duplicate of the optical code of the present embodiment obtained by copying the optical code using a copying machine and accordingly the data recorded in the infrared recording area is lost. In this way, the authenticity of the optical code can be determined.

In the optical code of the present embodiment, when compared to the first embodiment, the data in the visible recording area is checked against the data in the infrared recording area to determine authenticity of the optical code. Accordingly, the optical code of the present embodiment has an advantage of eliminating recording of data used for checking (the proper product identifier code of the first embodiment), into a device that carries out authentication. Further, the data recorded in the infrared recording area is intimately correlated with the product information recorded in the visible recording area. Accordingly, forged optical codes are more difficult to prepare by falsifying the product information.

Third Embodiment

Referring to the drawings referred to in the first embodiment and referring to FIG. 4, a third embodiment will be described.

In the present embodiment, part of the components of the first embodiment has been changed. Therefore, in the drawings, the components common to the first embodiment are designated with like reference numerals to omit duplicate description.

Similarly to the first embodiment (see FIG. 2), an optical code 1a of the present embodiment includes the dark color modules 2b configuring an encoded data region 4. The dark color modules 2b include the infrared reflective dark modules 2ba and the infrared absorptive dark modules 2bb. As shown in FIG. 4, the infrared reflective dark modules 2ba of the present embodiment include first infrared reflective modules 2baa and second infrared reflective dark modules 2bab.

Figure 5:
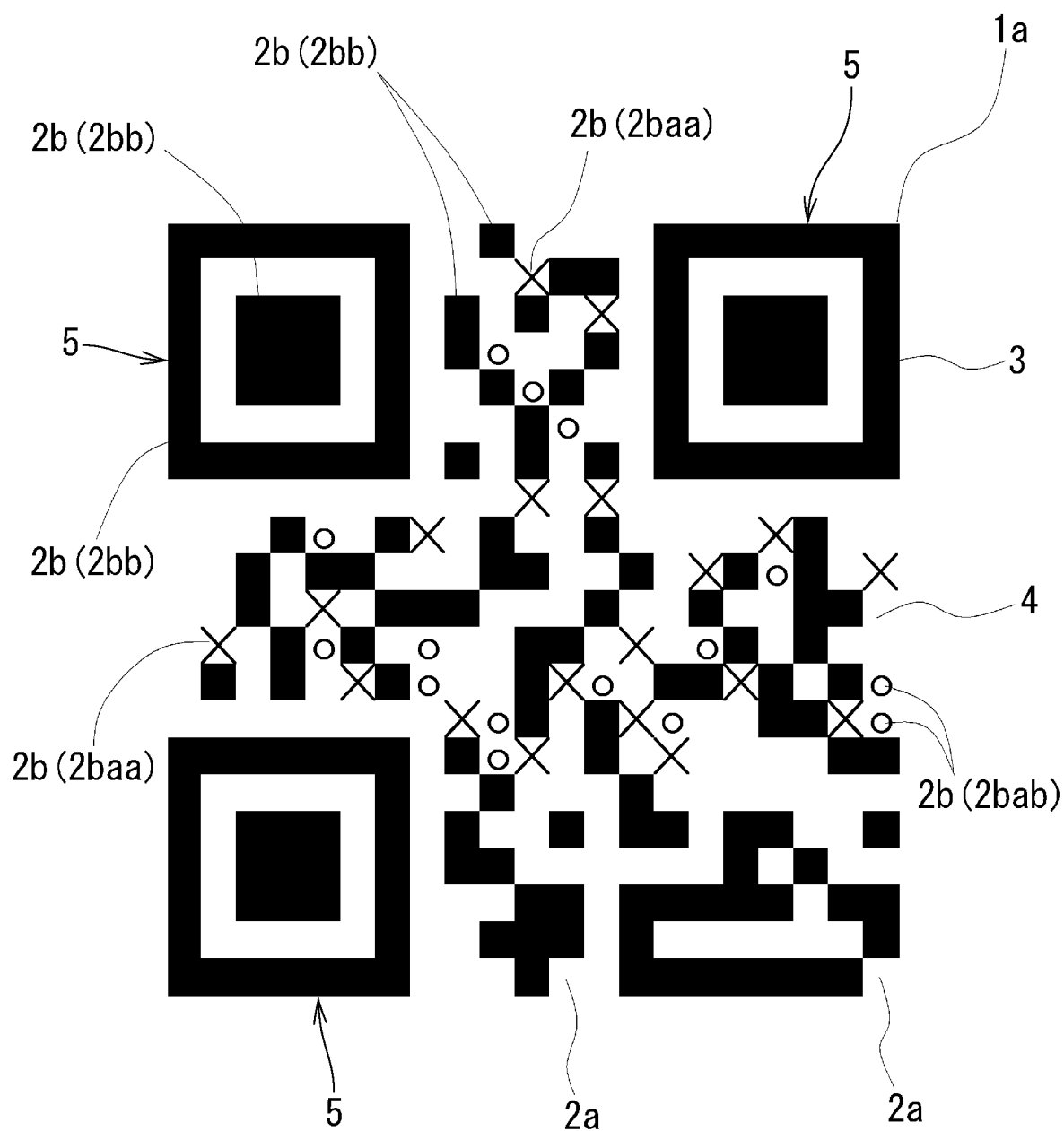
FIG. 5 is a diagram illustrating an optical code 1*a* of the third embodiment, in which first infrared reflective dark modules 2*baa*, second infrared reflective dark modules 2*ba*, and infrared absorptive dark modules 2*bb* are discriminated from each other.

The first infrared reflective dark modules 2baa have low reflectance for visible light and infrared light of 880 nm, and have high reflectance for infrared light of 1,000 nm. The second infrared reflective dark modules 2bab have low reflectance for visible light, have high reflectance for infrared light of 880 nm, and have high reflectance for infrared light of 1,000 nm. In FIG. 5, white modules are light color modules 2a, the modules marked with X are the first infrared reflective dark modules 2baa, the modules marked with O are the second infrared reflective dark modules 2bab, and black modules are infrared absorptive dark modules 2bb.

The optical code 1a of the present embodiment is provided with two kinds of data recording areas. One is an invisible light recording area (hereinafter referred to as invisible recording area) in which data is recorded using a pattern of the light color modules 2a and the dark color modules 2b in the encoded data region 4. The other is an infrared light recording area (hereinafter referred to as infrared recording area) in which data is recorded using a pattern of the first and second infrared reflective dark modules 2baa and 2bab, and the infrared absorptive dark modules 2bb in the encoded data region 4.

Similarly to the first embodiment, the visible recording area is used for recording product information (manufacturer ID, product identifier code, expiration date, lot number, and serial number). The product information recorded in the visible recording area, similarly to the first embodiment, is recorded based on QR code standards, and thus is readable by generally used QR code readers.

The infrared recording area is used for recording a proper product identifier code, which is the same as in the first embodiment. In the present embodiment, a proper product identifier code is encrypted using the ASCII code and imparted with an error correction code to thereby prepare binary data which is then converted to a ternary number. The ternary number data is recorded in a pattern of the first and second infrared reflective dark modules 2baa and 2bab, and the infrared absorptive dark modules 2bb in the encoded data region 4.

Therefore, the proper product identifier code recorded in the infrared recording area of the present embodiment enables individually measuring the reflectance for 880 nm and 1,000 nm infrared light and enables reading only by dedicated readers in which a decryption key is recorded to decrypt the encrypted proper product identifier code. In this way, the infrared recording area has characteristics as a secret area from which the recorded information can be read only by specially designed readers.

The optical code 1a of the present embodiment is prepared by applying a print of three kinds of black inks to a surface of a white paper base material 10 structuring a packaging box. Specifically, portions exposed to the surface of the paper base material 10 are used as the light color modules 2a having high visible light reflectance, and portions with a print of the black inks are used as the dark color modules 2b having low visible light reflectance. The three kinds of black inks include a first infrared transmissive black ink that absorbs 880 nm infrared light but transmits 1,000 nm infrared light, a second infrared transmissive black ink that transmits both 880 nm and 1,000 nm infrared light, and an infrared absorptive black ink that absorbs both 880 nm and 1,000 nm infrared light.

Specifically, the portions printed with/using the first infrared transmissive black ink allow transmission of only 1,000 nm infrared light for reflection at the paper base material to serve as the first infrared reflective dark modules 2baa. The portions provided with a print of the second infrared transmissive black ink allow transmission of both 880 nm and 1,000 nm infrared light for reflection at the paper base material to serve as the second infrared reflective dark modules 2bab. The portions provided with a print of the infrared absorptive black ink allow absorption of both 880 nm and 1,000 nm infrared light to serve as the infrared absorptive dark modules 2bb.

Since the optical code 1a of the present embodiment is prepared using three kinds of inks with different transmission characteristics, forgery of the optical code 1a with the same structure is more difficult than the optical code of the first embodiment. Thus, with a medication being packed in a packaging box affixed with the optical code 1a of the present embodiment, fake products of the medication are prevented from being distributed.

Fourth Embodiment

Figure 7:
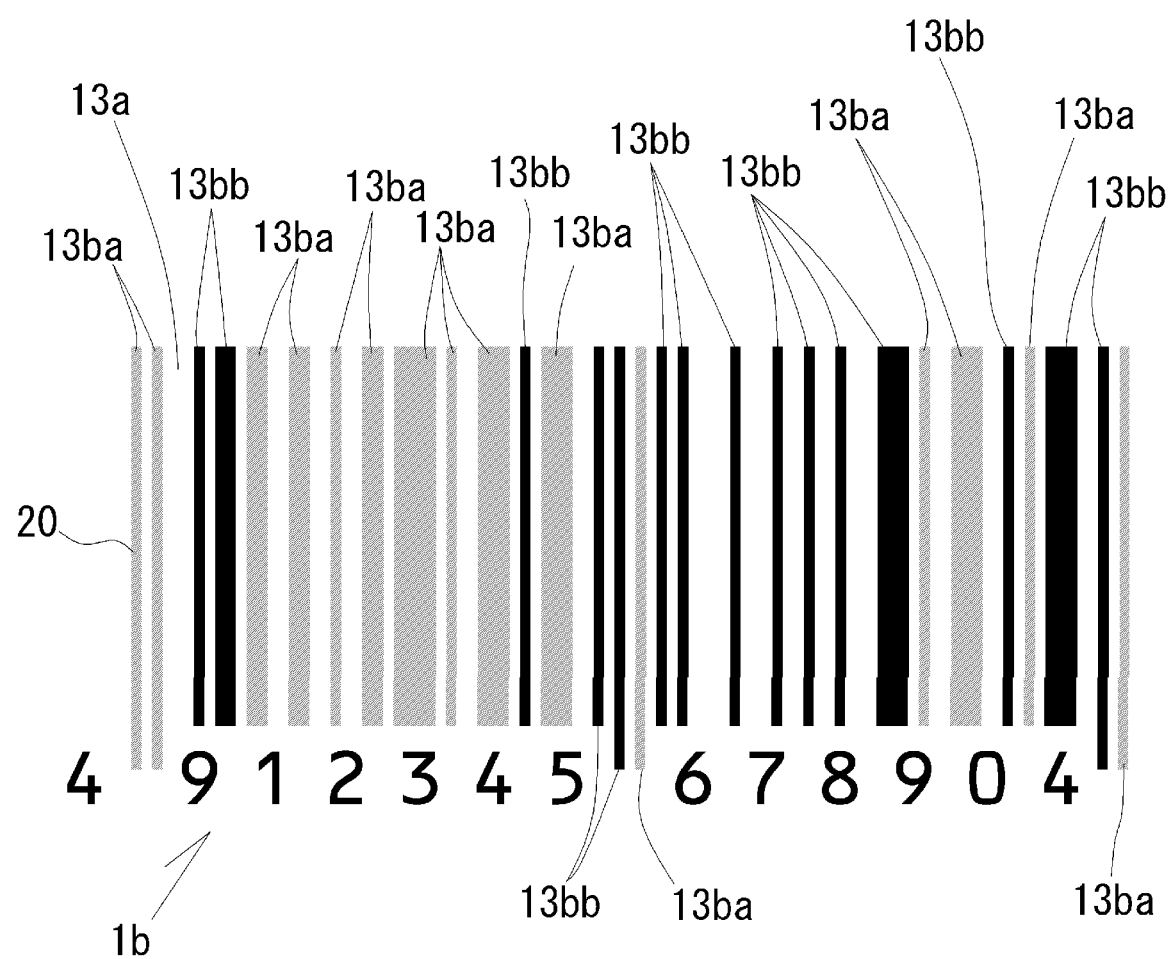
FIG. 7 is a diagram illustrating the optical code 1*b* of the fourth embodiment, in which infrared reflective dark color parallel bars 13ba are discriminated from infrared absorptive dark color parallel bars 13bb.

Referring to the drawings referred to in the first embodiment and referring to FIGS. 6 and 7, a fourth embodiment will be described. An optical code 1b of the present embodiment is used for commodity management of food, being affixed to packaging boxes of the food. The optical code 1b is compatible with EAN/JAN symbols as commodity barcodes (one-dimensional information code). Specifically, as shown in FIGS. 6A and 6B, the optical code 1b includes a barcode body 20 and visually observable number 21 indicated below the barcode body 20.

The barcode body 20 includes light color parallel bars 13a exhibiting white color, and dark color parallel bars 13b exhibiting black color, which are alternately arrayed in the reading direction. The light color parallel bars 13a include 1 to 4 slit-shaped light color modules 2a exhibiting white color and aligned in the longitudinal direction. The dark color parallel bars 13b include 1 to 4 slit-shaped dark color modules 2b exhibiting black color and aligned in the longitudinal direction. The light- and dark color modules 2a and 2b each have a predetermined unit width, while the light- and dark color parallel bars 13a and 13b each have a width one to four times larger than the unit width.

As shown in FIG. (a) of 6, the barcode body 20 includes controllers 18a, 18b and 18c, characters 16, and margins 17. The controllers 18a, 18b and 18c are arranged at the left end, the center, and the right end of the barcode body 20. The characters 16 each are used for recording data with a light-and-dark pattern of the parallel bars 13a and 13b. The margins 17 are respectively arranged on outer sides of the controllers 18a and 18c at the left and right ends and have a constant width. The controllers 18a, 18b and 18c, and the margins 17 are used for assisting optical reading of the barcode body 20. The left and right controllers 18a and 18c are each made up of alternately arranged one light color parallel bar 13a and two dark color parallel bars 13b. The controller 13b at the center is made up of alternately arranged three light color parallel bars 13a and two dark color parallel bars 13b.

The margins 17 have the same white color as that of the light color parallel bars 13a. The characters 16 are each made up of two light color parallel bars 13a and two dark color parallel bars 13b alternatively arranged. Six characters 16 are arranged between the left-end controller 18a and the center controller 18b, and six characters 16 are arranged between the center controller 18b and the right-end controller 18c. As shown in (b) of FIG. 6, one character 16 is made up of seven modules 2a and 2b, each expressing any one of numerals 1 to 9, depending on the width of the light- and dark color parallel bar 13a or 13b. The six characters 16 on the left each express any one of numerals 1 to 9, depending on the arrangement of the odd parity or the even parity.

Specifically, the barcode body 20 enables recording 13-digit number (decimal number) with a pattern of the light- and dark color parallel bars 13a and 13b. The 13-digit number recorded on the barcode body 20 includes a 12-digit product code for specifying a product and 1 check digit. The product code is made up of a business operator code and a product item code. Since these configurations are based on JIS standards (JIS X 0501: 1985), detailed description is omitted.

The visually observable number 21 expresses a 13-digit number recorded with a pattern of the light- and dark color parallel bars 13a and 13b. When reading of the product code recorded on the barcode body 20 is unsuccessful, the visually observable number 21 is used for the operator's manual input of the product code. The visually observable number 21 is printed with a font (e.g., OCR-B) readable by an OCR (optical character reader). The product code can be optically read by having an OCR read the visually observable number 21, instead of reading the barcode body 20.

In the present embodiment, the dark color modules 2b forming a dark color parallel bar 13b of the barcode body 20 are each made up of infrared reflective dark modules that reflect infrared light, and infrared absorptive dark modules that absorb infrared light. The dark color parallel bars 13b are each made up of infrared reflective dark parallel bars 13ba which are formed of the infrared reflective dark modules, and infrared absorptive dark parallel bars 13bb which are formed of the infrared absorptive dark modules. In FIG. 7, gray parallel bars are the infrared reflective dark parallel bars 13ba, and black parallel bars are the infrared absorptive dark parallel bars 13bb.

Similarly to the first embodiment, the optical code 1b of the present embodiment is prepared by providing a print of black inks to a surface of a white paper basic material 10 structuring a packaging box. Specifically, as shown (a) of in FIG. 3, portions not provided with a print of black inks 11a and 11b and exposing the surface of the paper base material 10 serve as the light color modules 2a having high visible light reflectance. Further, portions provided with a print of the black inks 11a and 11b serve as the dark color modules 2b having low visible light reflectance. Of these two kinds of black inks 11a and 11b, the ink 11a transmits infrared light and the ink 11b absorbs infrared light.

The paper base material 10 has high reflectance for visible and infrared lights. As shown in FIG. 3B, the portions where a layer of the infrared transmissive black ink 11a is formed transmits infrared light for reflection at the paper base material 10 to serve as the infrared reflective dark modules 2ba. The portions where a layer of the infrared absorptive black ink 11b is formed absorb infrared light to serve as the infrared absorptive dark modules 2bb.

The white margin 17, where no print of the black inks 11a and 11b is provided, is exposed to the surface of the paper base material 10, similarly to the light color modules 2a. In the margin 17, the visually observable number 21 is printed using the infrared absorptive black ink 11b. In general, white paper base materials have high infrared reflectance, black dye inks transmit infrared light, and black pigment inks absorb infrared light. Therefore, the optical code 1b of the present embodiment can be prepared using generally used materials.

The optical code 1b of the present embodiment also includes two kinds of areas for recording data. One is a visible recording area used for recording a 13-digit number made up of light- and dark color parallel bars 13a and 13b of the respective characters 16. The other is an infrared recording area used for recording data made up of infrared reflective and absorptive dark parallel bars 13ba and 13bb of the barcode body 20.

The infrared recording area will be specifically described. Irrespective of the data to be recorded in the visible recording area, the barcode body 20 includes 30 dark color parallel bars 13b (6 in the controllers 18a, 18b and 13c, and 24 in the characters 16). The 30 dark color parallel bars 13b of the present embodiment are each selectively formed either of the infrared reflective dark parallel bars 13ba or the infrared absorptive dark parallel bars 13bb to record 30-bit data in the infrared recording area.

The optical code 1b of the present embodiment includes product information (additional product information) recorded in the infrared recording area, in addition to the product code recorded in the visible recording area. Specifically, an expiration date of the product is recorded as the additional product information in the present embodiment.

More specifically, a number 201703318 made up of an expiration date (2017/3/31) and a check digit 8 is converted to a 30-bit binary number 001100000001011011111110010110 and recorded in a pattern of the infrared reflective and absorptive dark parallel bars 13ba and 13bb. As shown in FIG. 7, the infrared reflective dark parallel bars 13ba each indicate 0, and the infrared absorptive dark bars 13bb each indicates 1 in the present embodiment. Also, the bit order of the dark color parallel bars 13b is higher on the left and becomes lower toward the right.

The optical code 1b of the present embodiment can be easily prepared, for example, using a method including the steps provided below.

(1) Obtaining Recording Data

Data (product code) to be recorded in the visible recording area and data (expiration date) to be recorded in the infrared recording area are obtained.

(2) Preparation of Barcode-Based Data

Barcode information is prepared to record the product code obtained in step (1). That is, a pattern of the light- and dark color parallel bars 13a and 13b of the optical code 1b is determined. Since this step can be performed according to known methods of preparing EAN/JAN symbols, specific description is omitted.

(3) Preparation of Recording Data for Infrared Recording Area

A check digit is calculated from the expiration date and suffixed thereto, followed by conversion into 30-digit binary data.

(4) Determination of Infrared Reflective and Absorptive Dark Parallel Bars

Based on the 30-digit binary data prepared in step (3), a pattern of the infrared reflective and absorptive dark modules 2ba and 2bb in the dark color parallel bars 13b is determined. Specifically, if a bit with a given order in the 30-digit binary data prepared in step (3) is 0, the dark color module 2b at a position corresponding to the bit with that order is determined to be an infrared reflective dark module 2ba, and if 1, determined to be an infrared absorptive dark parallel bar 13bb. In the present embodiment, the dark color modules 2b are correlated to the binary data such that higher bit orders are expressed by the leftward dark color modules 2b. However, correlation between the dark color parallel bars 13b and bit orders may be determined as appropriate.

(5) Printing

Similarly to the first embodiment, an optical code 1b is printed on a paper base material 10 structuring a packaging box, using the black inks 11a and 11b.

The optical code 1b of the present embodiment records a product code in the visible recording area according to the standards of EAN/JAN symbols. Therefore, the product code recorded in the optical code 1b can be read by generally used readers for reading EAN/JAN symbols. Thus, product management can be conducted for food in a packaging box which is affixed with the optical code 1b of the present embodiment, by having a generally used reader for EAN/JAN symbols read the product code in each stage of distribution.

Use of a dedicated reader enables simultaneous reading of both the product code recorded in the visible recording area and the expiration date recorded in the infrared recording area of the optical code 1b of the present embodiment. The dedicated reader that can read the optical code 1b of the present embodiment has a hardware configuration which is the same as the configuration of the dedicated reader described in the first embodiment. Such a dedicated reader simultaneously conducts reading of a product code and an expiration date according to the following procedure.

(1) Visible Light Image Capture Process

An image of the optical code 1b is captured with visible light. Specifically, the infrared filter is demounted from the light path. Then, with a visible light filter being mounted to the light path, an image of the optical code 1b is captured. As necessary, visible light is irradiated to the optical code 1b using an irradiator.

(2) Infrared Light Image Capture Process

An image of the optical code 1b is captured with infrared light. Specifically, the visible light filter is demounted from the light path. Then, with an infrared filter being mounted to the light path, an image of the optical code 1b is captured. As necessary, infrared light is irradiated to the optical code 1b using an irradiator.

(3) Visible Light Reflection Characteristics Discrimination Process

Based on the image captured in the visible light image capture process, the position of the barcode body 20 is specified to discriminate the array of the light- and dark color modules 2a and 2b in the barcode body 20. This step can be performed by known methods for reading EAN/JAN symbols.

(4) Reading Product Information

Based on the results of discrimination made in the visible light reflection characteristics discrimination process, a product code recorded in the visible recording area is decrypted. This step can be performed by known methods for reading EAN/JAN symbols.

(5) Infrared Reflection Characteristics Discrimination Process

Based on the image captured in the infrared light image capture process, modules in the array are discriminated. The array is made up of modules having high infrared reflectance (light color modules 2a and infrared reflective dark modules) and modules having low infrared reflectance (infrared absorptive dark modules). Combining the results of discrimination of the modules with the results of the visible light reflection characteristics discrimination process, it is discriminated whether each of the dark color parallel bars 13b included in the barcode body 20 is an infrared reflective dark parallel bar 13ba or an infrared absorptive dark parallel bar 13bb.

(6) Infrared Recording Area Reading Process

Based on the results of the infrared reflection characteristics discrimination process, the expiration date recorded in the infrared recording area is decrypted.

As described above, the optical code 1b of the present embodiment includes a pattern of the light- and dark color parallel bars 13a and 13b recording a product code according to the standards of EAN/JAN symbols. Accordingly, the product code can be read by the readers used for reading EAN/JAN symbols. That is, the optical code 1b is compatible with the EAN/JAN symbols. Then, when the infrared reflectance is measured to specify the pattern of the infrared reflective and absorptive dark modules 13ba and 13bb, additional product information (expiration date) that cannot be recorded with EAN/JAN symbols can be read from the optical code of the present disclosure.

Thus, the product code and the expiration date recorded on the optical code 1b affixed to the packaging box of a food product are simultaneously read by a POS system at the time when the product is sold. Accordingly, products are prevented from being sold just before the expiration dates or after the expiration dates. Further, use of the optical code 1b of the present embodiment enables daily expiration date management without having to visually recognize the expiration dates of products.

Fifth Embodiment

With reference to the drawings referred to in describing the fourth embodiment, a fifth embodiment will be described.

In the present embodiment, part of the components of the fourth embodiment has been changed. Therefore, in the following description, components common to the fourth embodiment are designated with like reference numerals to omit duplicate description.

The optical code of the present embodiment is characterized in that the code enables recording of the type of additional product information recorded on the dark parallel bars 13*b* in the characters 16. Specifically, the type of additional product information is recorded on the dark-parallel bars 13*b* of the controllers 18*a*, 13*b* and 18*c*. More specifically, in the present embodiment, several types of additional product information, such as an expiration date, freshness date, and lot number, are selectively recorded in the infrared recording area. The additional product information is recorded in a pattern of the infrared reflective and absorptive dark parallel bars 13*ba* and 13*bb* of the 24 dark parallel bars 13*b* which configure the characters 16.

When recording a 6-digit expiration data (the last 2 digits of year+2 digits of month+2 digits of day), 24 bits are sufficient for the recording. Of the six dark color parallel bars 13*b* configuring the controllers 18*a*, 18*b* and 18*c*, two at both ends are fixed to be infrared absorptive dark parallel bars 13*bb*, and the remaining four are used for recording the type of the additional product information which is recorded on the dark color parallel bars 13*b* in the characters 16, with a pattern of the infrared reflective and absorptive dark parallel bars 13*ba* and 13*bb*.

In the present embodiment, the dark color parallel bars 13*b* at both ends are fixed to be infrared absorptive dark parallel bars 13*bb*. Therefore, the present embodiment has an advantage of being able to precisely specify both ends of the barcode body 20 in an image captured with infrared light. The infrared recording area of the present embodiment is used for recording additional product information and the information indicating the type of the additional product information. Thus, the present embodiment is able to further improve the convenience as a commodity management barcode.

Sixth Embodiment

With reference to the drawings referred to in describing the fourth embodiment, a sixth embodiment will be described.

In the present embodiment, part of the components of the fourth embodiment has been changed. Therefore, in the following description, the components common to the fourth embodiment are designated with like reference numerals to omit duplicate description.

The optical code of the present embodiment is characterized in that the code enables recording of the format of additional product information recorded on the dark parallel bars 13*b* in the characters 16. Specifically, of the six dark parallel bars 13*b* of the controllers 18*a*, 18*b*, and 18*c*, two on both ends are fixed to be infrared absorptive dark parallel bars 13*bb*.

As described above, this is because both ends of the barcode body 20 can be easily specified in an image captured with infrared light. The remaining four dark parallel bars 13*b* of the controllers 18*a*, 18*b* and 18*c* of the present embodiment are used for recording the information on format of the additional product information recorded on the dark parallel bars 13*b* in the characters 16. The information on format is recorded with a pattern of the infrared reflective and absorptive dark parallel bars 13*ba* and 13*bb*.

The format of the additional product information will be described in detail. Except the ones at both ends, the four dark parallel bars 13*b* of the controllers 18*a*, 18*b* and 18*c* are defined to be control bars C1, C2, C3 and C4 from the left. The control bar C1 indicates a recording area of the additional product information. Specifically, when the control bar C1 is an infrared absorptive dark parallel bar 13*bb*, the additional product information is recorded only on the 24 dark parallel bars 13*b* in the characters 16. When the control bar C1 is an infrared reflective dark parallel bar 13*ba*, the format of the additional product information is not recorded on the control bars C2, C3 and C4, but the 27 dark parallel bars 13*b* including the control bars C2, C3 and C4 are used for recording the additional product information. The control bar C2 indicates the presence/absence of mask processing which will be described later.

When the control bar C2 is an infrared absorptive dark parallel bar 13*bb*, the optical code has not been subjected to mask processing. When the control bar C2 is an infrared reflective dark parallel bar 13*ba*, the optical code has been subjected to mask processing using a predetermined mask pattern. The control bar C3 indicates whether the additional product information recorded on the dark parallel bars 13*b* in the characters 16 has been encrypted.

When the control bar C3 is an infrared absorptive dark parallel bar 13*bb*, the optical code has not been encrypted. When the control bar C3 is an infrared reflective dark parallel bar 13*ba*, the optical code has been encrypted. The control bar C4 indicates whether the dark parallel bars 13*b* in the characters 16 include an error correction code. When the control bar C4 is an infrared absorptive dark parallel bar 13*bb*, it indicates "absence of error correction code". When the control bar C4 is an infrared reflective dark parallel bar 13*ba*, it indicates "presence of error correction code".

As described above, the optical code of the present embodiment is selectively mask-processed when the code is prepared. The mask processing is performed to improve the accuracy of reading the infrared reflective and absorptive dark parallel bars 13*ba* and 13*bb*. Specifically, the mask processing depends on whether the number of the infrared reflective dark parallel bars 13*ba* or the infrared absorptive dark parallel bars 13*bb* is 15 or more (the number of the others is 9 or less) at the stage preceding the mask processing. If the number is 15 or more, the 24-bit data recorded on the characters 16 and the prescribed mask pattern (e.g., 010101010101101010101010) are subjected to XOR operation to change part of the dark parallel bars 13*b*, i.e. to change part of the infrared reflective dark parallel bars 13*ba* to infrared absorptive dark parallel bars 13*bb*, or vice versa.

In this way, in the present embodiment, when the number of the infrared reflective dark parallel bars 13*ba* is unbalanced with the number of the infrared absorptive dark parallel bars 13*bb*, mask processing is performed for the levelling in the number between the infrared reflective dark parallel bars 13*ba* and the infrared absorptive dark parallel bars 13*bb* to improve the accuracy of reading.

As described above, with the optical code of the present embodiment, the additional product information can be encrypted at the time of preparing the optical code. The optical code is proposed to be encrypted by using, for example, encryption mask processing, bit position conversion, and bit shifting, singly or in combination. In the encryption mask processing, XOR operation is performed for the recording information (additional product information) and a secret mask pattern.

The bit position conversion is a process of converting the value of a bit at a specified position in the recording information, and is a method for performing interleaving. In the bit shifting, the recording information is shifted to the right by 1 bit, and the right end bit is moved to the left end. For example, when performing encryption by combining mask processing, bit position conversion, and bit shifting, a common key is used. The common key includes a mask pattern of the mask processing, the number of times of bit position conversion, and the number of times of bit shifting.

As described above, the optical code of the present embodiment enables recording an error correction code in an infrared recording area. The target of error correction is the product code recorded in the visible recording area. When the error correction code is recorded on the infrared recording area, the additional product information is not recorded in the infrared recording area. When an error correction code is recorded in the infrared recording area as in the above configuration, the accuracy of reading EAN/JAN symbols or the like and the time taken for reading can be greatly reduced.

The optical code of the present embodiment can be prepared through the process including the following steps, for example.

(1) Obtaining Recording Data

Data (product code) to be recorded in the visible recording area and data (additional product information) to be recorded in the infrared recording area are obtained.

(2) Preparation of Barcode-Based Data

Since this step is the same as the one in the fourth embodiment, description is omitted.

(3) Preparation of Recording Data for Infrared Recording Area

Since this step is the same as the one in the fourth embodiment, description is omitted.

(3a) Calculation of Error Correction Code

In the case of recording an error correction code in the infrared recording area, the error correction code is calculated.

(3b) Encryption of Data

In the case of encrypting additional product information, the data is encrypted.

(4) Determination of Infrared Reflective Dark Parallel Bars and Infrared Absorptive Dark Parallel Bars Since this step is the same as the one in the fourth embodiment, description is omitted.

(5) Mask-Processing

If the number of modules is 15 or more in either the infrared reflective dark modules 2ba or in the infrared absorptive dark modules 2bb determined at step (4), mask processing is performed.

(6) Printing

Since this step is the same as the one in the fourth embodiment, description is omitted.

Seventh Embodiment

With reference to the drawings referred to in describing the fourth embodiment, a seventh embodiment will be described.

In the present embodiment, part of the components of the fourth embodiment has been changed. Therefore, in the drawings, the components common to the fourth embodiment are designated with like reference numerals to omit duplicate description.

The present embodiment is characterized in that 13-digit visible number 21 is configured by infrared reflective numerals formed of the infrared transmissive black ink 11a and infrared absorptive numerals formed of the infrared absorptive black ink 11b. Specifically, the present embodiment provides an extended infrared recording area for recording 13-bit data of the visible number 21 in a pattern of the infrared reflective numerals and the infrared absorptive numerals. According to the present embodiment, additional product information of a type different from the type recorded in the infrared recording area is recorded in the extended infrared recording area. When the recording capacity of the infrared recording area is insufficient for some information, the information is divided and separately recorded in the infrared recording area and the extended infrared recording area.

When an image of the optical code of the present embodiment is captured with visible light, all the numerals of the 13-digit number are in a dark color (black). Therefore, all the numerals of the 13-digit number can be read by OCR. When an image of the optical code of the present embodiment is captured with infrared light, the infrared transmissive numerals are difficult to be discriminated from the background. Therefore, only the infrared absorptive numerals are read by OCR. Thus, similarly to the data recorded in the infrared recording area, the data recorded in the extended infrared recording area can be optically discriminated based on the images respectively captured with visible light and infrared light.

Eighth Embodiment

With reference to FIG. 8 and the drawings referred to in describing the fourth embodiment, an eighth embodiment will be described.

In the present embodiment, part of the components of the fourth embodiment has been changed. Therefore, in the following description and in the drawings, the components common to the fourth embodiment are designated with like reference numerals to omit duplicate description.

The present embodiment is characterized in that the infrared reflectance of the infrared reflective dark modules 2ba is made lower than in the fourth embodiment. Specifically, the infrared reflective dark modules 2ba of the present embodiment are not formed of only the infrared transmissive black ink 11a, but formed of an infrared semi-transmissive black ink 11c obtained by mixing the infrared transmissive black ink 11a with a small amount of the infrared absorptive black ink 11b. The infrared semi-transmissive black ink 11c does not allow complete transmission of infrared light but allows partial transmission of infrared light with a part being absorbed thereby. Therefore, as shown in FIG. 8, the infrared reflectance of the infrared reflective dark modules 2ba of the present embodiment is about 50%. The infrared reflective dark modules 2ba, when seen in visible light, are black and have visible light reflection characteristics equivalent to those of the infrared absorptive dark modules 2bb.

The infrared reflectance in the optical code of the present embodiment is high (75% or more) in the light color module 2a, about 50% in the infrared reflective dark module 2ba, and low (25% or less) in the infrared absorptive dark module 2bb. Thus, the infrared reflectance is different, in the present embodiment, between the light color module 2a, the infrared reflective dark module 2ba and the infrared absorptive dark module 2bb. Therefore, only the measurement of infrared reflectance enables discrimination between the light color module 2a, the infrared reflective dark module 2ba and the infrared absorptive dark module 2bb.

Use of the following dedicated reader, for example, enables simultaneous reading of the product code recorded in the visible recording area and the additional product information recorded in the infrared recording area in the optical code of the present embodiment.

The dedicated reader includes an imaging unit provided with an imaging device for detecting infrared light, an irradiator for irradiating infrared light, a control unit for controlling image capture and data processing, a display for displaying various pieces of information, and a communicator for outputting data to the outside. The dedicated reader is capable of simultaneously reading the product code recorded in the visible recording area and the additional product information recorded in the extended infrared recording area by performing the following steps.

(1) Infrared Light Image Capture Process

An image of the optical code is captured with infrared light. Specifically, infrared light is irradiated to the optical code from the irradiator, so that an imaging unit can capture an image of the optical code that has reflected the infrared light.

(2) Threshold Determination Process

A frequency distribution of infrared intensity is measured for a plurality of pixels included in an image captured in the infrared light image capture process to determine thresholds of the pixels having comparatively high infrared reflectance, the pixels having intermediate infrared reflectance, and the pixels having comparatively low infrared reflectance. Specifically, the optical code of the present embodiment is made up of three kinds of modules, i.e. the light color modules 2a having high infrared reflectance, the infrared reflective dark modules 2ba having intermediate infrared reflectance, and the infrared absorptive dark modules 2bb having low infrared reflectance. Therefore, there are three peaks in the frequency distribution of infrared intensity. In the threshold process, the levels of the troughs between the three peaks are determined to be thresholds.

(3) Infrared Reflection Characteristics Discrimination Process

The thresholds determined in the threshold determination process are used as criteria. Based on the image captured in the infrared light image capture process, the position of the barcode body 20 is specified to discriminate the array of the light color modules 2a having high infrared reflectance, the infrared reflective dark modules having intermediate infrared reflectance, and the absorptive dark modules 2bb having low infrared reflectance. Then, in a pattern of the barcode body 20, the light color parallel bars 13a are discriminated from the dark color parallel bars 13b. At the same time, each dark color parallel bar 13b is discriminated as to whether it is an infrared reflective dark parallel bar 13ba or an infrared absorptive dark parallel bar 13bb.

(4) Product Information Reading Process

The product code recorded in the visible recording area is decrypted based on the pattern of the light- and dark color parallel bars 13a and 13b discriminated in the infrared reflection characteristics discrimination process. The present step can be performed based on known methods of reading EAN/JAN symbols.

(5) Infrared Recording Area Reading Process

The additional product information is decrypted based on the pattern of the infrared reflective and absorptive dark parallel bars 13ba and 13bb discriminated in the infrared reflection characteristics discrimination process.

In this way, with the optical code of the present embodiment, only the measurement of the infrared reflectance of the modules enables reading of the product code recorded in the visible recording area, and the additional product information recorded in the infrared recording area, without having to measure the visible light reflectance. The optical code of the present embodiment can be prepared using a method similar to that used for the optical code 1b of the fourth embodiment, except the use of the infrared semi-transmissive black ink 11c, instead of the infrared transmissive black ink 11a, for printing the infrared reflective dark modules 2ba. Alternative to the printing using the infrared semi-transmissive black ink 11c, the infrared reflective dark modules 2ba of the present embodiment may be formed by printing the infrared transmissive black ink 11a and then printing a small amount of infrared absorptive black ink 11b over the infrared transmissive black ink 11a.

Ninth Embodiment

Referring to the drawings referred to in describing the fourth embodiment, a ninth embodiment will be described.

In the present embodiment, part of the configuration of the fourth embodiment has been changed. Therefore, in the following description, the components common to the fourth embodiment are designated with like reference numerals to omit duplicate description.

In the optical code 1b of the fourth embodiment described above, the dark color modules 2b are configured by two kinds of dark color modules 2ba and 2bb having equivalent visible light reflection characteristics but having different infrared reflection characteristics.

In this regard, the optical code of the present embodiment is provided with dark color modules 2b which are configured by two kinds of modules having different visible light reflection characteristics. Specifically, in the present embodiment, the dark color modules 2b are configured by black modules and blue modules. Further, the dark color parallel bars 13b are configured by black parallel bars made up of the black modules, and blue parallel bars made up of the blue modules. In place of the infrared recording area of the fourth embodiment, the present embodiment is provided with an extended visible recording area in which data is recorded depending on whether the dark color parallel bars 13b are the black parallel bars or the blue parallel bars. Additional product information is recorded in the extended visible recording area.

The optical code of the present embodiment can be prepared, for example, by applying printing using black and blue inks to a white paper base material 10 structuring a packaging box. Specifically, portions where the surface of the paper base material is exposed with no black or blue ink printed thereon serve as the light color modules 2a (light color parallel bars) having high visible light reflectance, portions where black ink is printed serve as the black modules (black parallel bars), and portions where blue ink is printed serve as the blue modules (blue parallel bars). Accordingly, the optical code of the present embodiment can be prepared using generally used materials.

The optical code of the present embodiment enables readers generally used for reading EAN/JAN symbols to read the product code recorded in the visible recording area.

This is because readers generally used for reading EAN/JAN symbols can discriminate blue modules from dark color modules. In an image of the optical code of the present embodiment captured with visible light, black modules can be discriminated from blue modules. Therefore, the optical code of the present embodiment enables a smartphone, for example, installed with a dedicated reading program to read the additional product information recorded in the extended visible recording area. Thus, the optical code of the present embodiment contributes to facile expansion of readers for reading the additional product information.

For example, when a smartphone installed with a dedicated program for reading the optical code of the present embodiment performs the following processes, the product code recorded in the visible recording area and the additional product information recorded in the extended visible recording area can be simultaneously read.

(1) Visible Light Image Capture Process

An image of the optical code 1b is captured with visible light. Specifically, RGB values based on white or near-white illumination are obtained. An image of the optical code 1b is captured in a state in which the infrared filter is demounted from the light path and the visible light filter is mounted to the light path. As necessary, the optical code 1b is irradiated with visible light using the irradiator.

(2) Light and Dark Discrimination Process

A plurality of pixels included in the image captured in the visible light image capture process are measured as to the frequency distribution of brightness. Then, the trough between two peaks appearing in the frequency distribution is determined to be a threshold between a light color pixel having a relatively high visible light reflectance and a dark color pixel having a relatively low visible light reflectance. Then, the pixels included in the image captured in the visible light image capture process are classified into light- and dark color pixels based on the threshold. Then, the position of the barcode body 20 is specified based on the distribution of the light- and dark color pixels, and further, the array of the light color modules 2a in the barcode body 20 is discriminated from the array of the dark color modules 2b. The present step can be performed using well-known methods of reading EAN/JAN symbols.

(3) Product Information Reading Process

The product code recorded in the visible recording area is decrypted based on the pattern of the light- and dark color parallel bars 13a and 13b discriminated in the light and dark discrimination process. The present step can be performed using well-known methods of reading EAN/JAN symbols.

(4) Blue Light Reflection Characteristics Discrimination Process

The plurality of pixels included in the image captured in the visible light image capture process are measured as to frequency distribution of intensity of blue light components (B value of RGB values). Then, the trough between two peaks appearing in the frequency distribution is determined to be a threshold between a blue light reflective pixel having a relatively high blue light reflectance and a blue light absorptive pixel having a relatively low visible light reflectance. Then, the pixels included in the image captured in the visible light image capture process are classified into blue light reflective pixels and blue light absorptive pixels based on the threshold. In the present step, basically, the pixels corresponding to the black modules are classified into blue light absorptive pixels, while the pixels corresponding to the light color modules and the blue modules are classified into blue light reflective pixels. Then, the pixels included in the dark color modules 2b discriminated in the light and dark discrimination process are each determined as to whether the pixel is configured by a blue light reflective pixel or a blue light absorptive pixel. As a result, the array of the black modules in the barcode body 20 is discriminated from the array of the blue modules. Consequently, each of the dark color parallel bars 13b included in the barcode body 20 is discriminated as to whether the parallel bar is a black parallel bar or a blue parallel bar.

(5) Infrared Recording Area Reading Process

The additional product information recorded in the extended visible recording area is decrypted based on the results of discrimination in the red light reflection characteristics discrimination process.

Tenth Embodiment

Referring to the drawings referred to in describing the fourth embodiment, a tenth embodiment will be described.

The present embodiment is another example of a dedicated reader which is capable of simultaneously reading the product code in the visible recording area and the additional product information in the infrared recording area from the optical code 1b of the fourth embodiment.

A dedicated reader of the present embodiment includes an irradiator, an imaging unit, an invisible light partial filter, a control unit, a display and a communicator. The irradiator is capable of irradiating visible light and infrared light. The imaging unit includes an imaging device capable of detecting visible light and infrared light. The invisible light partial filter is arranged to shield visible light, transmit infrared light, and cause the imaging unit to receive the transmitted infrared light, of the light reflected on a part (center in the height direction) of an imaging area of the imaging unit. However, as to the light reflected on the rest of the imaging area, transmit visible light, and cause the imaging unit to receive the transmitted visible light. The control unit controls image capture and data processing. The display displays various pieces of information. The communicator outputs data to the outside.

Specifically, the imaging unit can capture an image of an optical code with light that is the reflection of light irradiated to the optical code 1b from the irradiator. The imaging unit includes a visible light recorded data reader and an invisible light recorded data reader. The visible light recorded data reader is capable of reading information, based on a module pattern which is obtained from an image captured with reflected visible light. The invisible light recorded data reader is capable of reading information, based on a module pattern which is obtained from an image captured with reflected infrared light. The invisible light partial filter is arranged on the light path between the lens and the imaging device of the imaging unit.

Figure 9:
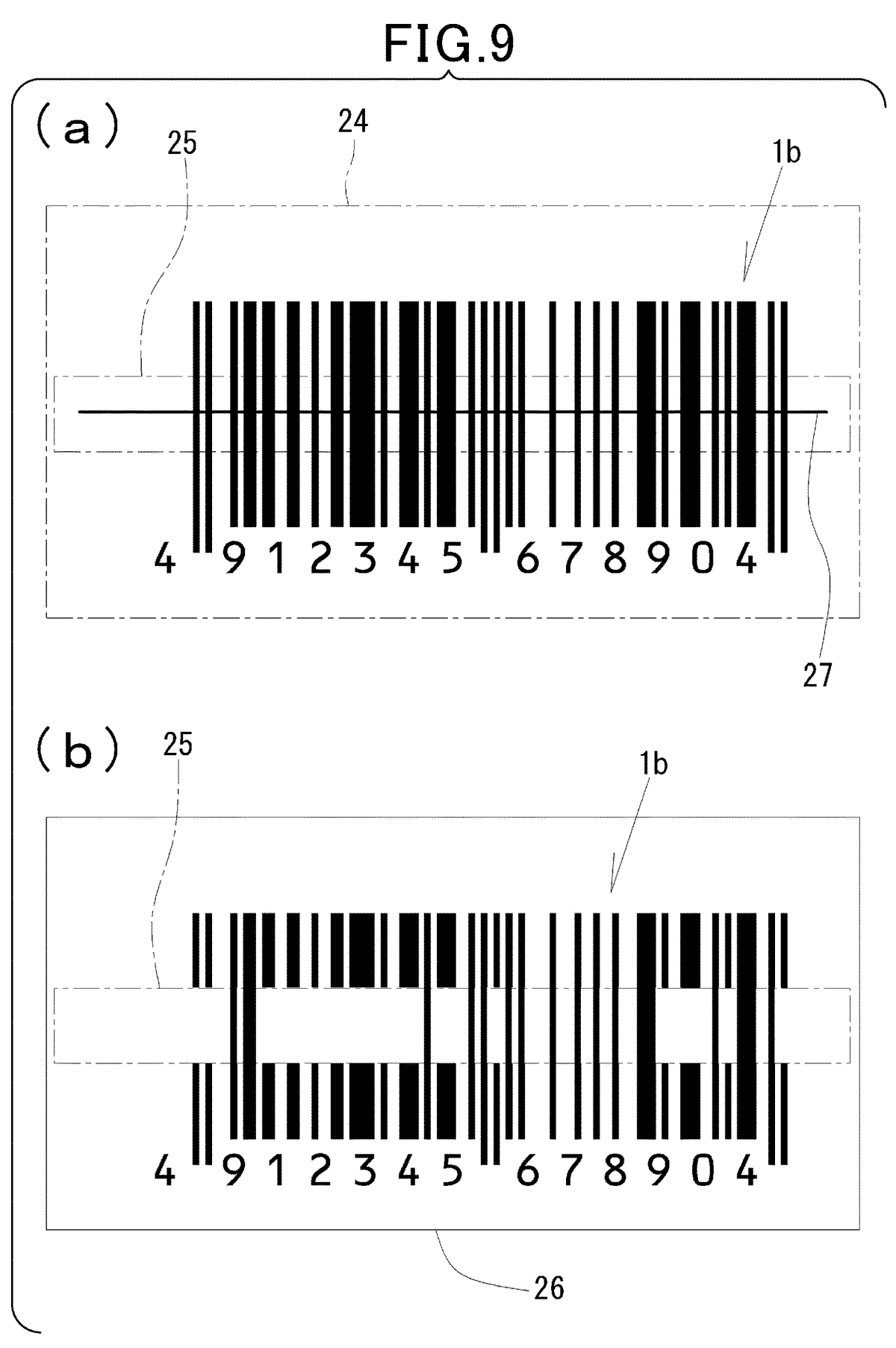

FIG. 9, (a) thereof, shows an imaging area 24 in a rectangular shape imaged by the imaging unit. The imaging area 24 includes a slit-shaped area traversing the center portion in the height direction to serve as a visible light shielding area 25 that shields visible light. Specifically, the light that has been reflected by the visible light shielding area 25 is received by the imaging device of the imaging unit after visible light being shielded by the invisible light partial filter. The invisible light partial filter shields infrared light in the light reflected from the area other than the visible light shielding area 25 and only allows transmission of visible light.

The dedicated reader includes a guideline projector capable of irradiating red laser light, traversing the center portion in the height direction of the imaging area 24. The guideline projector is used for confirming the position of the visible light shielding area 25 when capturing an image of the optical code 1b.

The dedicated reader of the present embodiment simultaneous reads the product code and the additional product information, according to the following procedure.

(1) Image Capture Process

An image of the optical code 1b is captured in a state in which infrared light and visible light are irradiated from the irradiator, and red laser light is irradiated from the guideline projector. In this case, as shown in (a) of FIG. 9, the imaging area 24 is positioned such that the red laser light 27 irradiated from the guideline projector traverses the center portion in the height direction of the barcode body 20.

(2) Image Division Process

In dividing an image, an image 26 captured in the image capture process is divided into an image of the visible light shielding area 25 and an image of the area other than the visible light shielding area 25. As shown in (b) of FIG. 9, the visible light shielding area 25 of the image 26 captured in the image capture process is shielded from visible light reflection and thus appears as an image captured with infrared light. The area excepting the visible light shielding area 25 is shielded from infrared light reflection and thus appears as an image captured with visible light. This is because, in the image capture process, the image of the barcode body 20 is captured, with the visible light shielding area 25 traversing the barcode body 20, and accordingly the image 26 of the barcode body 20 is captured with infrared light reflected from the visible light shielding area 25, and with visible light reflected from the upper and lower areas of the visible light shielding area 25.

(3) Visible Light Reflection Characteristics Discrimination Process

The position of the barcode body 20 is specified based on the image of the area excepting the visible light shielding area 25 captured in the image capture process to discriminate the array of the light color modules 2a from the array of the dark color modules 2b in the barcode body 20. The present step can be performed using well-known methods of reading EAN/JAN symbols.

(4) Product Information Reading Process

The product code recorded in the visible recording area is decrypted based on the results of the discrimination of the visible light reflection characteristics discrimination process. The present step can be performed using well-known methods of reading EAN/JAN symbols.

(5) Infrared Reflection Characteristics Discrimination Process

Based on the image of the visible light shielding area 25 captured in the image capture process, the array of the modules having high infrared reflectance is discriminated from the array of the modules having low infrared reflectance in the barcode body 20. Then, combining the results of the discrimination in the present step with those in the visible light reflection characteristics discrimination process, it is discriminated whether each of the dark color parallel bars 13b in the barcode body 20 is an infrared reflective dark parallel bar 13ba or an infrared absorptive dark parallel bar 13bb.

(6) Infrared Recording Area Reading Process

Based on the results of discrimination in the infrared reflection characteristics discrimination process, the expiration date recorded in the infrared recording area is decrypted.

As described above, according to the dedicated reader of the present embodiment, only one time image capture enables discrimination between the array of the light color modules 2a, the array of the infrared reflective dark modules, and the array of the infrared absorptive dark modules to simultaneously read the product code in the visible recording area and the additional product information in the infrared recording area.

Eleventh Embodiment

Referring to the drawings referred to in describing the tenth embodiment and FIG. 10, an eleventh embodiment will be described.

In the present embodiment, part of the configuration of the dedicated reader of the tenth embodiment has been changed. Therefore, in the following description and the drawings, the components common to the tenth embodiment are designated with like reference numerals to omit detailed description.

The present embodiment is characterized in that the invisible light partial filter is arranged in the irradiator to shield the light irradiated from the irradiator, instead of the light reflected from the imaging area 24. Specifically, with respect to the visible light and infrared light irradiated to the imaging area 24 from the irradiator, the invisible light partial filter shields visible light and transmits infrared light, as to the light irradiated to the visible light shielding area 25. As to the light irradiated to the area other than the visible light shielding area 25, the invisible light partial filter transmits visible light and shields infrared light.

In the dedicated reader of the present embodiment, the irradiator irradiates visible light not to the visible light shielding area 25 but to the area surrounding the visible light shielding area 25. Accordingly, as shown in (a) of FIG. 10, the visible light shielding area 25 is visually recognized to be dark when an image of the optical code 1b is captured. Thus, according to the dedicated reader of the present embodiment, the position of the visible light shielding area 25 is confirmed based on light and dark of visible light.

The dedicated reader of the present embodiment can simultaneously read the product code and the additional product information through a procedure similar to that of the dedicated reader of the tenth embodiment. As shown in (a) of FIG. 10, the imaging area 24 is positioned such that the visible light shielding area 25 traverses through the center portion in the height direction of the barcode body 20 to capture an image of the optical code 1b. Then, as shown in (b) of FIG. 10, an image (see (b) of FIG. 9) similar to that obtained in the image capture process of the tenth embodiment is obtained.

Twelfth Embodiment

Referring to the drawings referred to in describing the fourth embodiment and FIG. 11, a twelfth embodiment will be described.

In the present embodiment, part of the configuration of the fourth embodiment has been changed. Therefore, in the drawings, the components common to the tenth embodiment are designated with like reference numerals to omit description.

Figure 11:
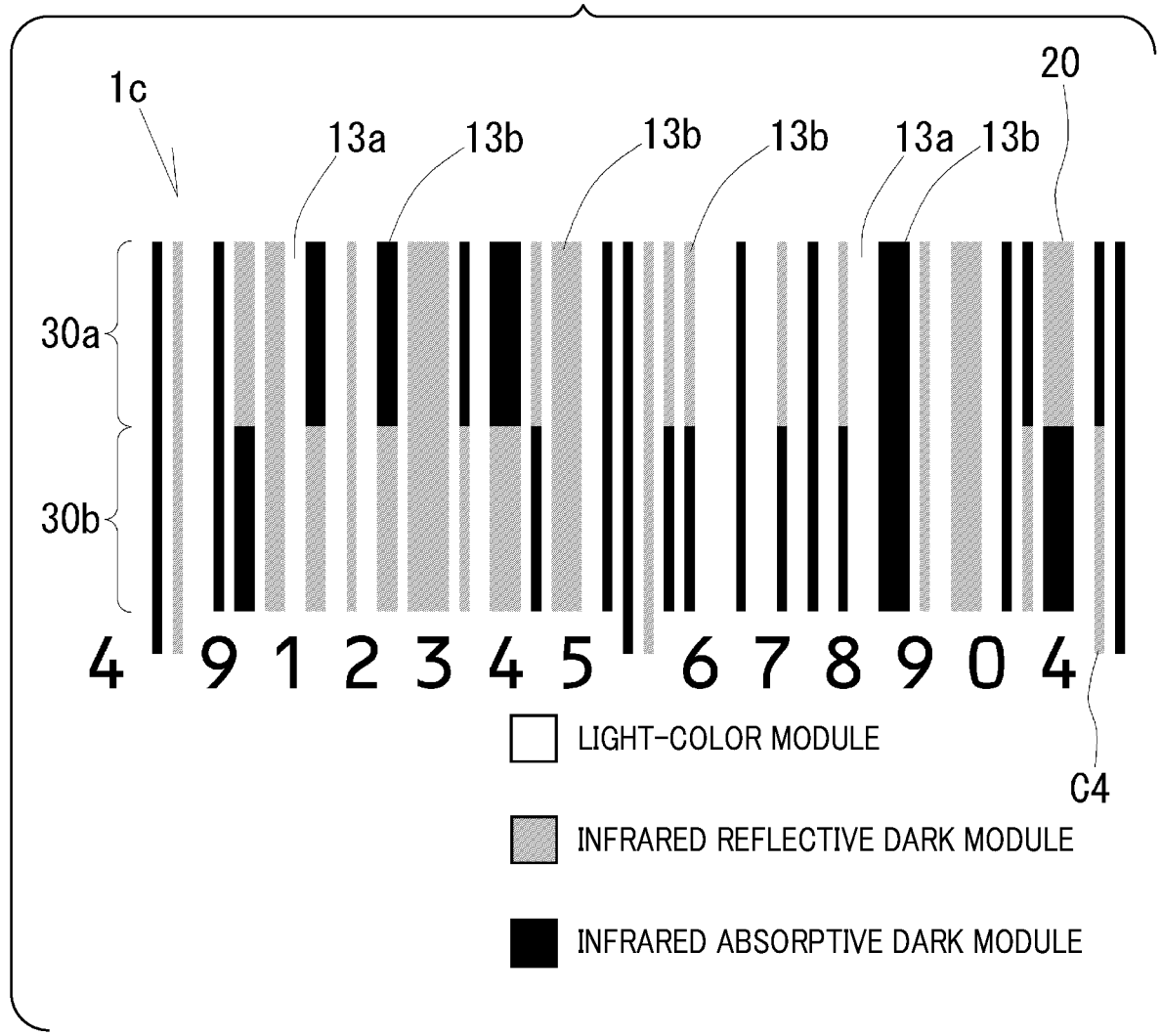
FIG. 11 is a diagram illustrating an optical code 1c according to a twelfth embodiment, in which infrared reflective dark modules are discriminated from infrared absorptive dark modules.

As shown in FIG. 11, an optical code 1c of the present embodiment is characterized in that the light- and dark color parallel bars 13a and 13b are made up of two module rows 30a and 30b which are vertically arranged along a reading direction (right-and-left direction). Specifically, the arrangement includes dark color parallel bars 13b whose upper halves are infrared reflective dark modules 2ba and lower halves are infrared absorptive dark modules 2ba, and includes dark color parallel bars 13b whose lower halves are infrared reflective dark modules 2bb and upper halves are infrared absorptive dark modules 2bb. The pattern of the infrared reflective dark modules 2ba and the infrared absorptive dark modules 2bb is different between the upper module row 30a and the lower module row 30b.

The optical code 1c of the present embodiment includes a first infrared recording area and a second infrared recording area. In the first infrared recording area, data is recorded with a pattern of the infrared reflective and absorptive dark modules 2ba and 2bb of the upper module row 30a. In the second infrared recording area, data is recorded with a pattern of the infrared reflective and absorptive dark modules 2ba and 2bb of the lower module row 30b. Thus, the optical code 1c of the present embodiment has an advantage of recording more additional product information compared to the optical code 1b of the fourth embodiment.

The optical code 1c of the present embodiment includes a dark color parallel bar C4, that is the second bar from the right of the barcode body 20, which is constantly made up of a lower half infrared reflective dark module 2ba and an upper half infrared absorptive dark module 2bb, irrespective of the data to be recorded in the infrared recording areas. The dark color parallel bar C4 is used for assisting optical reading of the barcode body 20 and is a part determined in advance to constantly serve as a dark color module 2b. In the present embodiment, it is determined whether the dark color module 2b at the position corresponding to the dark color parallel bar C4 is an infrared reflective dark module 2ba or an infrared absorptive dark module 2bb when measuring the infrared reflectance of the module row 30a or 30b. Thus, the present embodiment has an advantage of being able to discriminate the upper module row 30a from the lower module row 30b without confusion.

Thirteenth Embodiment

Referring to the drawings referred to in describing the first embodiment and FIGS. 12 and 13, a thirteenth embodiment will be described.

The present embodiment is a reading assist device that enables a smartphone to read the data recorded in the infrared recording area of the optical code 1 of the first embodiment.

In general, an imaging device of the camera in smartphones has sensitivity not only to a visible light area but also to an infrared area. Accordingly, when an image is captured by the camera of a smartphone with only reflected infrared light, with reflected visible light being shielded, the infrared light can be discriminated between high and low reflectance in the image, for each of the modules 2 of the optical code 1. The reading assist device of the present embodiment enables a smartphone to capture an image under such conditions and allows the smartphone to serve as a reader for reading data recorded in the infrared recording area of the optical code 1.

Figure 12:
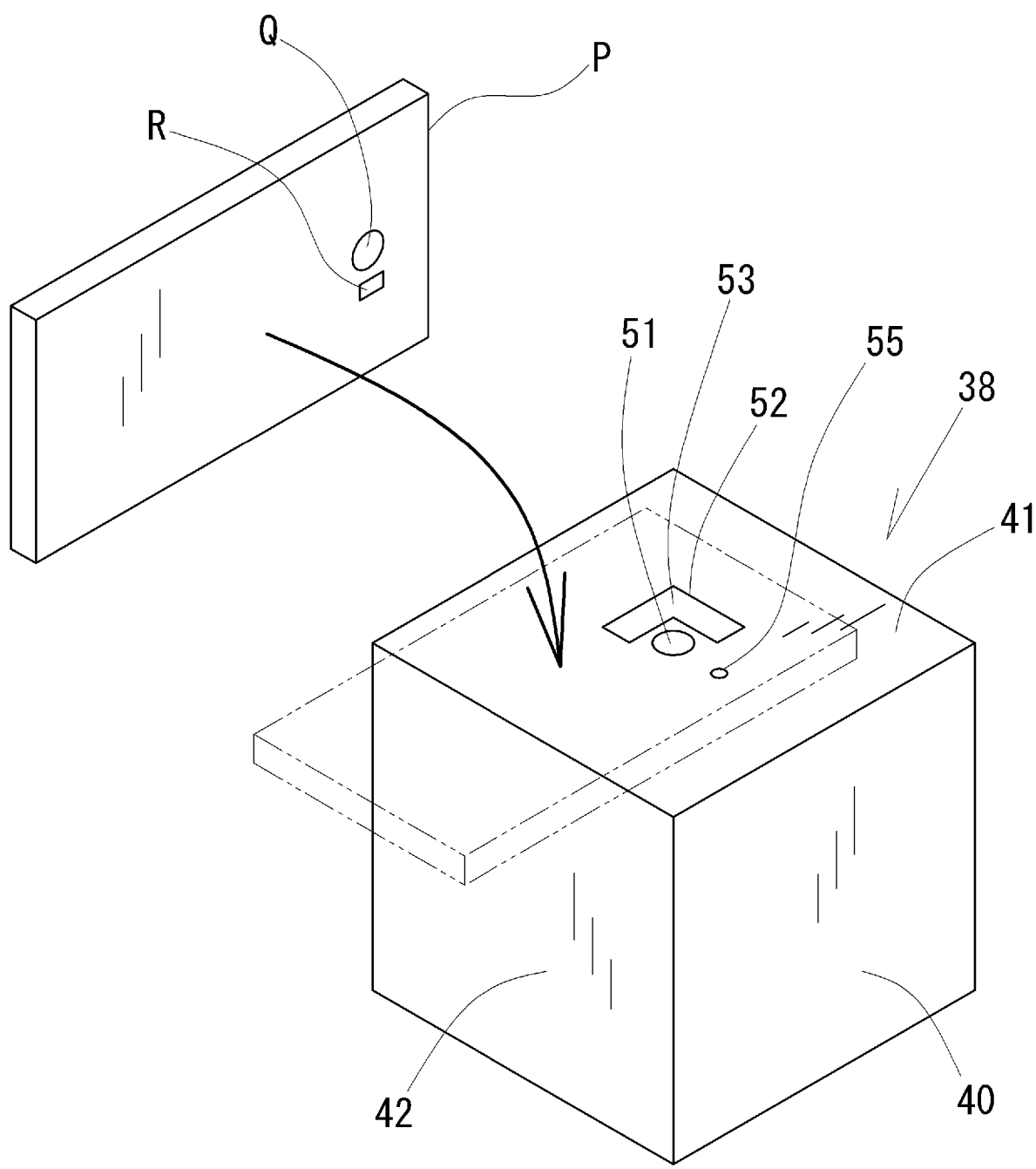
FIG. 12 is a perspective view illustrating a read assist device 39 according to a thirteenth embodiment and a smartphone.
Figure 13:
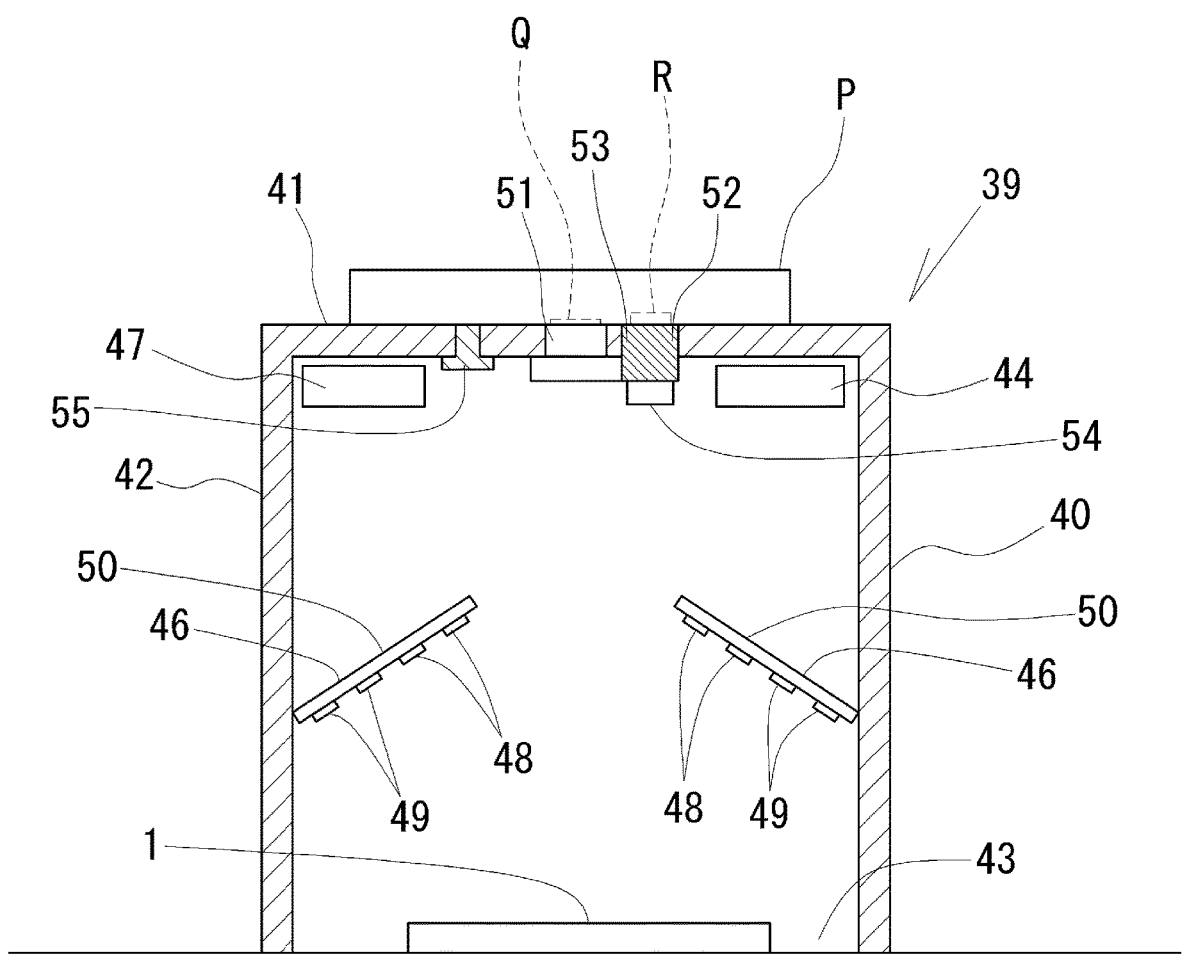
FIG. 13 is a vertical cross-sectional view of a casing 40 to show an inner structure of the read assist device 39 of the thirteenth embodiment.

As shown in FIGS. 12 and 13, a reading assist device 39 of the present embodiment is provided with a housing 40. The housing 40, which is in a cubic shape, includes a top plate 41 and a side wall 42 and has a bottom portion which is provided as an opening 43. The housing 40 is internally provided with a battery 44 as an electrical power source, an illuminator 46 that selectively irradiates white light and infrared light, and a control unit 47 that controls the illuminator 46. The illuminator 46 has a base 50 on which a white LED 48 for irradiating white light and an infrared LED 40 for irradiating infrared light are mounted. The illuminator 46 is arranged such that white or infrared light is irradiated toward the bottom portion of the housing 40.

As shown in FIGS. 12 and 13, the top plate has a center portion where a camera opening 51 is formed so that a back camera of a smartphone P can capture an image of the optical code 1 arranged at the bottom portion of the housing 40. The camera opening 51 is a through hole with a diameter a little larger than a lens Q of the back camera. The top plate 41 is formed with an illumination opening 52 in an L shape, in plan view, located near the camera opening 51. The illumination opening 52 is fitted with a light guide panel 53 for diffusing light (visible light) on the inside of the housing. Right beneath the illumination opening 52, a light-receiving sensor 54 is arranged to detect visible light that has passed through the opening 52 and has been diffused by the light guide panel 53. The top plate 41 is provided with a motion sensor 55 for detecting placement of the smartphone P. The motion sensor 55 is a pressure-sensitive switch which is in an on state while the smartphone P is placed on the top plate 41, due to the weight of the smartphone P.

When the motion sensor 55 is in an off state, i.e. when the smartphone P is not placed on the top plate 41, the control unit 47 controls the illuminator 46 so as not to irradiate white light and infrared light. When the motion sensor 55 is in an on state, i.e. when the smartphone P is placed on the top plate 41, the control unit 47 causes the illuminator 46 to selectively irradiate either white light or infrared light according to the detection state of the light-receiving sensor 54. Specifically, when the motion sensor 55 is in an on state and the light-receiving sensor 54 has detected light, the control unit 47 causes the illuminator 46 to irradiate only white light. When the motion sensor 55 is in an on state and the light-receiving sensor 46 has not detected light, the control unit 47 causes the illuminator 46 to irradiate only infrared light.

The following description addresses a method of reading data recorded in the visible and infrared recording areas of the optical code 1 using the reading assist device 39 and the smartphone P. Steps (5) to (9) performed by the smartphone P are the same as the steps described under the same names in the first embodiment. Therefore, detailed description is omitted.

(1) Placement of Optical Code

As shown in FIG. 13, a medication packaging box affixed with the optical code 1 is arranged at the bottom portion of the housing 40 such that the optical code 1 is on top.

(2) Placement of Smartphone

As shown in FIGS. 12 and 13, the smartphone P is placed on the top plate 41. In this case, the smartphone P is positioned such that the lens Q of the back camera of the smartphone P is located right above the camera opening 51 of the top plate 41 and that an LED light R arranged near the lens Q is located right above the illumination opening 52. At this point, the LED light R of the smartphone P is in an off state.

(3) Infrared Light Image Capture Process

An image of the optical code 1 located at the bottom portion is captured through the camera opening 51 by the back camera of the smartphone P placed on the top plate 41. In this case, the motion sensor 55 is in an on state and the LED light of the smartphone P is in an off state. Further, there is no entry of light from the illumination opening 52. Accordingly, the optical code 1 at the bottom portion is in a state of being irradiated with infrared light by the illuminator 46. In other words, an image of the optical code 1 is captured with infrared light in the present step.

(4) Visible Light Image Capture Process

The LED light R of the smartphone P placed on the top plate 41 is turned on and then an image of the optical code 1 at the bottom portion is captured through the camera opening 51 by the back camera. In this case, the motion sensor 55 is in an on state, and there is an entry of white light irradiated by the LED light R through the illumination opening 52, for detection by the light-receiving sensor 54. Accordingly, the optical code 1 at the bottom portion is in a state of being irradiated with white light by the illuminator 46. In other words, an image of the optical code 1 is captured with visible light in the present step.

(5) Visible light reflection characteristics discrimination process (6) Product code reading process (7) Infrared reflection characteristics discrimination process (8) Authentication process (9) Results output process In this way, using the reading assist device 39 of the present embodiment and the smartphone P, an image of the optical code 1 captured with visible light and an image of the same captured with infrared light can be obtained. Thus, the data recorded in the visible and infrared recording areas of the optical code 1 of the first embodiment can be more inexpensively read than when using a dedicated reader. In the present embodiment, white light is irradiated to the optical code 1 from the illuminator 46 arranged in the housing 40 of the reading assist device 39 in the visible light image capture process. As an alternative to irradiating white light from the illuminator 46, white light may be irradiated to the optical code 1 from the LED light R of the smartphone P.

The optical code of the present disclosure may be appropriately modified in the configurations of the foregoing embodiments within the spirit of the present disclosure. Although the patterns of the light- and dark color modules of the optical codes of the foregoing embodiments are based on the standard of QR code, the pattern of the light- and dark color modules of the optical code of the present disclosure may be based on the standards of optical codes other than QR code. Specifically, the pattern may be based on the standards of matrix type two-dimensional codes, such as data matrix, stack type two-dimensional codes, such as PDF 417, or barcodes (EAN/JAN symbols).

The optical codes of the foregoing embodiments are affixed to medication packaging boxes. However, not being limited to packaging boxes, the optical code of the present disclosure may be affixed to individual packages inside a packaging box, or may be affixed to product tags, or product bodies. Further, not being limited to packages of individual products, the optical code of the present disclosure may be affixed to cardboard boxes containing a plurality of products, or to cargo containers. Further, products affixed with the optical code of the present disclosure are not limited to medications. The optical of the present disclosure may be used for various products, including, for example, luxury brands such as bags or wallets, tickets, or cash vouchers. In the foregoing embodiments, the optical code is directly printed to the medication packaging box. Alternative to this, the optical code of the present disclosure may be printed onto a piece of sheet material and the piece of sheet material may be stuck to a packaging box.

In the foregoing embodiments, the dark color modules of the optical code are each formed of one type of ink layer. However, one dark color module may be made up of several types of ink layers. The ink layers forming the dark color modules are not limited to black-based inks, but may be process inks, or the like. The dark color modules are not limited to be formed of printing inks, but may be formed of toner inks, or the like. The layers of inks may be laminated on the front surface of a paper base material, or may be allowed to penetrate the paper base material.

In the foregoing embodiments, the first module (infrared reflective dark module 2ba) and the second module (infrared absorptive dark module 2bb) are included in the dark color module 2b and both are black. Alternative to this, the first and second modules of the present disclosure may have colors other than black color. The colors of the first and second modules are not required to be completely the same, but preferably required to have similar visible light reflection characteristics which does not easily enable visual discrimination between the first and second modules.

In the foregoing embodiments, the first module (infrared reflective dark module 2ba) and the second module (infrared absorptive dark module 2bb) are both included in the dark color module 2b. Alternative to this, the first and second modules of the present disclosure may be included in the light color module.

In the foregoing embodiments, infrared light of 1,000 nm is mainly used as a predetermined wavelength related to the present disclosure. However, the light may be ultraviolet light.

The optical codes of the foregoing embodiments record the second data related to the present disclosure, and the second data include a proper product identifier code for detecting a duplicate of the optical code, or additional product information other than the product code. However, the second data of the present disclosure are not limited to these code or information. For example, when the optical code of the present disclosure is an optical code for commodity management affixed to a food packaging box, prize win/lose information may be recorded as the second data in the infrared recording area. With this configuration, a customer, when purchasing the product, will know the prize win/lose information during checkout through the POS system of the store and can enjoy the advantage of the results.

If the name and address of the customer have been registered at the store, the information is provided to the maker through the POS system to ask for delivery of the prize. The prize win/lose information that can be recorded includes the win/lose data, e.g. indication of win or lose, or level of win such as first prize or second prize, or the like. Alternatively, a lottery number may be recorded in the infrared recording area for comparison with a winning number informed in advance through the POS system to determine win/lose or the level of win. The production serial number may be used as the lottery number.

REFERENCE SIGN LIST 1, 1a, 1b, 1c optical code
2 module
2a light color module
2b dark color module
2ba infrared reflective dark module (first module)
2baa first infrared reflective module
2bab second infrared reflective dark module
2bb infrared absorptive dark module (second module)
3 functional pattern
4 encoded data region
5 position detection pattern
10 paper base material 11a infrared transmissive black ink
11b infrared absorptive black ink

What is claimed is:

1. An optical code comprising:
a base layer having a surface providing light color modules each having a reflectance such that a light color is presented in visible light and infrared light;
a functional pattern positionally fixedly provided in a code area of the optical code on the surface of the base layer, the functional pattern being composed of dark color modules and the light color modules, the dark color modules of the functional pattern being all formed of infrared absorptive black ink coated on the surface of the base layer; and
an encoded data region provided in the code area of the optical code on the base layer, the functional pattern being positionally different from the encoded data region in the code area, wherein
the encoded data region includes a first pattern made up of (i) a plurality of the light color modules each presenting the light color in the visible light and the infrared light and each being formed by the surface of the base layer, and (ii) a plurality of dark color modules each presenting a dark color in the visible light, the first pattern recording first encoded data of the optical code,
the dark color modules of the encoded data region include at least a first module and a second module, the first and second modules having different reflectances to the infrared light, the first and second modules having equivalent reflection characteristics when the optical code is read in the visible light, the first and second modules being arranged as a single layer coated directly on the surface of the base layer without overlapping each other, the first and second modules recording a second pattern of second encoded data of the optical code, the second encoded data containing information different from information contained in the first encoded data and configured to be read when the infrared light is irradiated to the optical code, and
the first module is formed of infrared transmissive black ink coated on the surface of the base layer and the second module is formed of the infrared absorptive black ink coated on the surface of the base layer such that the first and second modules are both arranged as the single layer.

2. The optical code according to claim 1, wherein:
the first module is provided as a first dark color layer formed on the surface of the base layer, the first dark color layer transmitting the infrared light and having the dark color in the visible light;
the second module is provided as a second dark color layer formed on the surface of the base layer, the second dark color layer absorbing the infrared light and having the dark color in the visible light; and
the reflectance of the first module is higher to the infrared light compared to the reflectance of the second module to the infrared light.

3. The optical code according to claim 1, wherein:
the first module is provided as a first dark color layer formed on the surface of the base layer, the first dark color layer partially transmitting the infrared light and having the dark color in the visible light;
the second module is provided as a second dark color layer formed on the surface of the base layer, the second dark color layer absorbing the infrared light and having the dark color in the visible light; and
the reflectance of the first module is higher to the infrared light compared to the reflectance of the second module to the infrared light, and is lower to the infrared light compared to the reflectance of the light color modules to the infrared light.

4. The optical code according to claim 1, wherein the light color modules are white modules in the visible light, and the dark color modules are black modules in the visible light.

5. The optical code according to claim 1, wherein the optical code is a barcode in which light color parallel bars made up of the light color modules, and dark color parallel bars made up of the dark color modules are arrayed in a row in a reading direction along which a reading device optically scans the optical code.

6. The optical code according to claim 5, wherein:
the barcode includes margins on both sides, the margins having high reflectance for the infrared light and having the light color in the visible light; and
the dark color parallel bars provided on both ends are formed of either the first module or the second module whichever has low reflectance for the infrared light.

7. The optical code according to claim 6, wherein:
the array of the light color parallel bars and the dark color parallel bars is made up of two rows of modules arranged in the reading direction; and
the second encoded data are recorded in the respective rows of modules, the second encoded data depending on patterns of the first modules and the second modules, and identifier patterns are recorded in respective portions where patterns of the light color modules and the dark color modules are fixed, the identifier patterns being recorded in respective patterns of the first module and the second module to distinguish the two rows of modules from each other.

8. The optical code according to claim 5, wherein:
a barcode includes a barcode body made up of the light color parallel bars and the dark color parallel bars, and visually recognizable numbers provided below the barcode body to indicate the first encoded data, and the visually recognizable numbers including a first number and a second number having different reflectances to the infrared light; and
third data is recorded with a pattern of the first number and the second number.

9. The optical code according to claim 1, wherein:
the optical code is affixed to at least any of a product, a product package and a product tag; and
the second encoded data includes information used for commodity management, and identification information indicating a type of the information.

10. A method of producing the optical code, wherein the optical code comprises
a pattern made up of a plurality of light color modules of a light color and a plurality of dark color modules of a dark color, the pattern composing first data,
at least either the light color modules or the dark color modules including a first module and a second module having difference in reflectance for light of a predetermined wavelength, second data being recorded in the optical code using a pattern of the first module and the second module,
the method comprising:
a first step of determining a pattern of the light color modules and the dark color modules for recording the first data;

a second step of determining a pattern of the first module and the second module for recording the second data; and a third step of performing mask processing with a predetermined mask pattern with respect to the pattern of the first module and the second module determined in the second step to partially reverse the pattern of the first module and the second module.

11. A method of reading an optical code, wherein the optical code comprises a base layer having a surface providing light color modules each having a reflectance such that a light color is presented in visible light and infrared light;

a functional pattern positionally fixedly provided in a code area of the optical code on the surface of the base layer, the functional pattern being composed of dark color modules and the light color modules, the dark color modules of the functional pattern being all formed of infrared absorptive black ink coated on the surface of the base layer; and an encoded data region provided in the code area of the optical code on the base layer, the functional pattern being positionally different from the encoded data region in the code area, wherein the encoded data region includes a first pattern made up of (i) a plurality of the light color modules each presenting the light color in the visible light and the infrared light and each being formed by the surface of the base layer, and (ii) a plurality of dark color modules each presenting a dark color in the visible light, the first pattern recording first encoded data of the optical code, the dark color modules of the encoded data region include at least a first module and a second module, the first and second modules having different reflectances to the infrared light, the first and second modules having equivalent reflection characteristics when the optical code is read in the visible light, the first and second modules being arranged as a single layer coated directly on the surface of the base layer without overlapping each other, the first and second modules recording a second pattern of second encoded data of the optical code, the second encoded data containing information different from information contained in the first encoded data and configured to be read when the infrared light is irradiated to the optical code, and the first module is formed of infrared transmissive black ink coated on the surface of the base layer and the second module is formed of the infrared absorptive black ink coated on the surface of the base layer such that the first and second modules are both arranged as the single layer, the method comprising:

a visible light image capture step of capturing an image of the optical code with the visible light;

an infrared light image capture step of capturing an image of the optical code with the infrared light;

a visible light discrimination step of discriminating at least part of modules included in the optical code, as to whether each of the modules is the light color module or the dark color module, based on the image captured in the visible light image capture step;

a first infrared light discrimination step of discriminating at least part of the modules included in the optical code, a reflectance of each of the modules for the infrared light, based on the image captured in the infrared light image capture step;

a second infrared light module discrimination step of discriminating the at least part of the modules, as to whether each of the modules is the first module or the second module, based on the results of the visible light discrimination step and the first infrared light discrimination step;

a first decryption step of decrypting the first data, based on an output of the visible light image capture step; and a second decryption step of decrypting the second data, based on the results of the second infrared light module discrimination step.

* * * * *